United States Patent
Gonion

(10) Patent No.: US 9,529,574 B2
(45) Date of Patent: Dec. 27, 2016

(54) AUTO MULTI-THREADING IN MACROSCALAR COMPILERS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 14/532,846

(22) Filed: Nov. 4, 2014

(65) Prior Publication Data

US 2015/0058832 A1    Feb. 26, 2015

Related U.S. Application Data

(63) Continuation-in-part of application No. 12/888,658, filed on Sep. 23, 2010, now Pat. No. 8,949,808.

(51) Int. Cl.
*G06F 9/45* (2006.01)

(52) U.S. Cl.
CPC .............. *G06F 8/433* (2013.01); *G06F 8/445* (2013.01); *G06F 8/447* (2013.01)

(58) Field of Classification Search
None
See application file for complete search history.

(56) References Cited

U.S. PATENT DOCUMENTS

| | | | |
|---|---|---|---|
| 4,710,872 A | 12/1987 | Scarborough | |
| 4,833,606 A | 5/1989 | Iwasawa | |
| 5,274,812 A | 12/1993 | Inoue | |
| 5,325,533 A | 6/1994 | McInerney et al. | |
| 5,590,329 A | 12/1996 | Goodnow, II et al. | |
| 5,854,932 A | 12/1998 | Mariani et al. | |
| 6,760,903 B1 | 7/2004 | Morshed et al. | |
| 6,795,908 B1 | 9/2004 | Lee | |
| 7,447,886 B2 | 11/2008 | Lee | |
| 7,617,496 B2 | 11/2009 | Gonion | |
| 7,788,657 B2 | 8/2010 | Wannamaker et al. | |

(Continued)

FOREIGN PATENT DOCUMENTS

| | | |
|---|---|---|
| CN | 101477472 | 7/2009 |
| EP | 0785506 | 1/1997 |

(Continued)

OTHER PUBLICATIONS

Gupta et al. "Coordinated parallelizing compiler optimizations and high-level synthesis." ACM Transactions on Design Automation of Electronic Systems (TODAES), vol. 9.4, Published Oct. 2004, pp. 441-470.*

(Continued)

*Primary Examiner* — Chameli Das
*Assistant Examiner* — Joanne Macasiano
(74) *Attorney, Agent, or Firm* — Meyertons, Hood, Kivlin, Kowert & Goetzel, P.C.

(57) ABSTRACT

System and methods for the parallelization of software applications are described. In some embodiments, a compiler may automatically identify within source code dependencies of a function called by another function. A persistent database may be generated to store identified dependencies. When calls the function are encountered within the source code, the persistent database may be checked, and a parallelized implementation of the function may be employed dependent upon the dependency indicated in the persistent database.

20 Claims, 22 Drawing Sheets

(56) References Cited

U.S. PATENT DOCUMENTS

| | | |
|---|---|---|
| 8,621,448 B2 | 12/2013 | Gonion |
| 2002/0052856 A1 | 5/2002 | Satoh |
| 2004/0003381 A1 | 1/2004 | Suzuki |
| 2005/0097090 A1 | 5/2005 | Bird et al. |
| 2005/0125781 A1 | 6/2005 | Swamy et al. |
| 2005/0273769 A1 | 12/2005 | Eichenberger et al. |
| 2006/0005177 A1 | 1/2006 | Atkin et al. |
| 2006/0048111 A1 | 3/2006 | Archambault et al. |
| 2006/0176308 A1 | 8/2006 | Karandikar et al. |
| 2007/0294681 A1 | 12/2007 | Tuck et al. |
| 2008/0184211 A1* | 7/2008 | Nickolls ............ G06F 8/456 717/140 |
| 2009/0106537 A1 | 4/2009 | Colavin |
| 2009/0113386 A1 | 4/2009 | Eker et al. |
| 2009/0138862 A1 | 5/2009 | Tanabe et al. |
| 2009/0177669 A1 | 7/2009 | Ramarao et al. |
| 2009/0307656 A1* | 12/2009 | Eichenberger ......... G06F 8/45 717/110 |
| 2009/0307673 A1 | 12/2009 | Eichenberger et al. |
| 2010/0023926 A1 | 1/2010 | Sugawara et al. |
| 2010/0042789 A1 | 2/2010 | Gonion |
| 2010/0131478 A1 | 5/2010 | Bauchot |
| 2010/0281471 A1 | 11/2010 | Liao et al. |
| 2011/0041121 A1 | 2/2011 | Schalk |
| 2011/0307858 A1 | 12/2011 | Biswas et al. |
| 2011/0314256 A1 | 12/2011 | Callahan, II et al. |
| 2012/0180030 A1 | 7/2012 | Crutchfield et al. |

FOREIGN PATENT DOCUMENTS

| | | |
|---|---|---|
| JP | H09-198254 | 7/1997 |
| JP | 2004246776 | 2/2004 |
| JP | 2009-129179 | 6/2009 |
| WO | 9013081 | 11/1990 |

OTHER PUBLICATIONS

Kalogeropulos, Spiridon. "Identifying the available parallelism using static analysis." International Conference of the Austrian Center for Parallel Computation. Springer Berlin Heidelberg, Oct. 1993, pp. 151-165.*

Notice of Acceptance in Australian Application No. 2011305837 mailed May 4, 2015, 2 pages.

Office Action in Chinese Application No. 201180045583.4 mailed Apr. 27, 2015, 16 pages.

Notice of Preliminary Rejection in Korean Patent Application No. 10-2013-7010386 dated Apr. 22, 2015, 5 pages.

U.S. Appl. No. 12/888,658, filed Sep. 23, 2010, Jeffry E. Gonion.

Kral, Stefan, et al. "SIMD vectorization of straight line FFT code", Euro-Par 2003 Parallel Processing, Springer Berlin Heidelberg, 2003, pp. 251-260.

Lin, Yuan, et al. "Soda: A Low-Power Architecture for Software Radio." ACM Sigarch Computer Architecture News, vol. 34. No. 2 IEEE Computer Society, 2006.

Notice of Preliminary Rejection in Korean Application No. 10-2013-7010386 mailed Jul. 29, 2014, 5 pages.

Patent Examination Report No. 1 in Australian Application No. 2011305837 mailed Apr. 29, 2014, 4 pages.

Chen et al., "RIPPLES: Tool for Change in Legacy Software," Proceedings IEEE International Conference on Software Maintenance—ICSM-2001, Nov. 7-9, 2001, pp. 230-239.

Nong et al., "A Parallelizing Translator for Object-Oriented Large-Grain Data Flow Model," Proceedings of the Twenty-Eighth Southeastern Symposium on System Theory, Mar. 31-Apr. 2, 1996, pp. 431-435.

Burgess, Mark. "C Programming Tutorial", 1987, pp. 21-25.

"Compile." http://ieeexplore.ieee.org/stamp/stamp.jsp?tp=&arnumber=4116791. ieeexplore, 2000. Web. May 20, 2013.

International Search Report and Written Opinion in Application No. PCT/US2011/050713 filed Sep. 7, 2011, 18 pages.

"A Framework for Selective Recompilation in the Presence of Complex Intermodule Dependencies", Chambers, et al., 1995, pp. 221-230.

\* cited by examiner

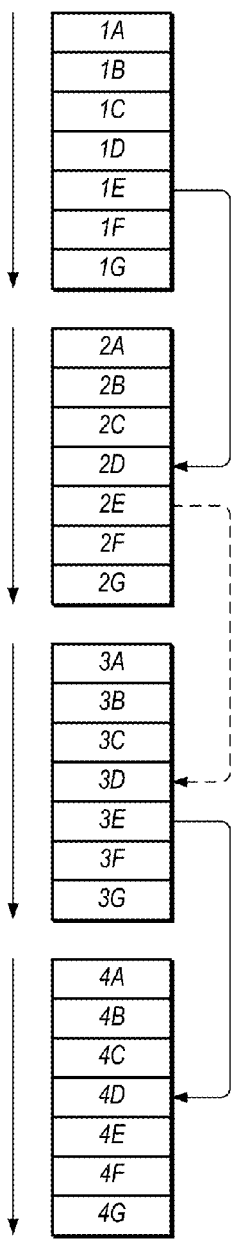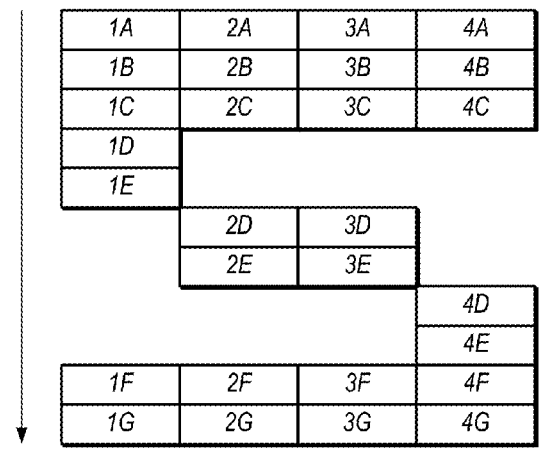
FIG. 3

| | | | | |
|---|---|---|---|---|
| x = 0, | A[x] = 1, | r = 1, | s = 0, | B[x] = 1 |
| x = 1, | A[x] = 10, | r = 1, | s = 16, | B[x] = 17 |
| x = 2, | A[x] = 16, | r = 1, | s = 16, | B[x] = 17 |
| x = 3, | A[x] = 16, | r = 1, | s = 26, | B[x] = 27 |
| x = 4, | A[x] = 26, | r = 1, | s = 29, | B[x] = 30 |
| x = 5, | A[x] = 29, | r = 1, | s = 9, | B[x] = 10 |
| x = 7, | A[x] = 9, | r = 13, | s = 9, | B[x] = 22 |
| x = 7, | A[x] = 1, | r = 0, | s = 9, | B[x] = 9 |
| x = 8, | A[x] = 20, | r = 0, | s = 20, | B[x] = 20 |
| x = 9, | A[x] = 0, | r = 17, | s = 20, | B[x] = 37 |
| x = 10, | A[x] = 16, | r = 17, | s = 9, | B[x] = 26 |
| x = 11, | A[x] = 14, | r = 17, | s = 1, | B[x] = 18 |
| x = 12, | A[x] = 20, | r = 17, | s = 17, | B[x] = 34 |
| x = 13, | A[x] = 14, | r = 17, | s = 19, | B[x] = 36 |
| x = 14, | A[x] = 22, | r = 17, | s = 15, | B[x] = 32 |
| x = 15, | A[x] = 13, | r = 17, | s = 30, | B[x] = 47 |

*FIG. 4A*

| x = | 0 | 1 | 2 | 3 | 4 | 5 | 6 | 7 |
|---|---|---|---|---|---|---|---|---|
| A[x] = | 1 | 10 | 16 | 16 | 26 | 29 | 9 | 1 |
| r = A[x+s] = | 1 | | | | | | | |
| s = A[x+r] = | | 16 | 16 | 26 | 29 | 9 | | |
| r = A[x+s] = | | | | | | | 13 | 0 |
| B[x] = | 1 | 17 | 17 | 27 | 30 | 10 | 22 | 9 |

| x = | 8 | 9 | 10 | 11 | 12 | 13 | 14 | 15 |
|---|---|---|---|---|---|---|---|---|
| A[x] = | 20 | 0 | 16 | 14 | 20 | 14 | 22 | 13 |
| s = A[x+r] = | 20 | | | | | | | |
| r = A[x+s] = | | 17 | | | | | | |
| s = A[x+r] = | | | 9 | 1 | 17 | 19 | 15 | 30 |
| B[x] = | 20 | 37 | 26 | 18 | 34 | 36 | 32 | 47 |

*FIG. 4B*

SOURCE CODE

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

FIG. 5A

VECTORIZED CODE

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

FIG. 5B

EXAMPLE 2A
VECTORIZED
(NON-SPECULATIVE)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

FIG. 6A

EXAMPLE 2B
VECTORIZED
(SPECULATIVE)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

FIG. 6B

SOURCE CODE

```
for (x=0; x<KSIZE; ++x)
{
    r = C[x];
    s = D[x];
    A[x] = A[r] + A[s];
}
```

VECTORIZED CODE

```
        x = VectorIndex (0,1) ;
        goto Loop1Tail ;
Loop1:
        ~p0; r = VectorReadInt(C,x);
        ~p0; s = VectorReadInt (D, x) ;
        i1 = CheckHazardP(r,x,p0);
        i2 = CheckHazardP(s,x,p0);
        i3 = VectorMax(i1,i2);
        p4 = 0 ;
Loop2:
        ~p0; p4 = GeneratePredicates (p4, i3) ;
        ~p4; t1 = VectorReadInt(A,r) ;
        ~p4; t2 = VectorReadInt(A,s);
        ~p4; t3 = t1 + t2 ;
        ~p4; VectorWriteInt(A,x,t3);
        ~p0; if (!LAST(p4)) goto Loop2;
        x += VECLEN;
Loop1Tail:
        p0 = (x < KSIZE) ;
        if ( FIRST (p0) ) goto Loop1 ;
```

FIG. 8

SOURCE CODE

```
j = 0 ;
for (x=0; x<KSIZE; ++x)
{
    f = A[x];
    g = B[x];
    if (f < FACTOR)
    {
        h = C[x];
        j = E[h];
    {
    if (g < FACTOR)
    {
        i = D[x];
        E[i] = j;
    }
}
```

VECTORIZED CODE

```
x = VectorIndex (0,1) ;
goto Loop1Tail ;
Loop1:
    j = PropagatePriorF(j,p0);
    ~p0; f = VectorReadInt(A,x);
    ~p0; g = VectorReadInt (B, x) ;
    !p0; p1 = (f < FACTOR);
    !p0; p2 = (g < FACTOR);
    ~p1; h = VectorReadInt(C,x);
    ~p2; i = VectorReadInt(D,x);
    !p1; ix = CheckHazardP(h,i,p2);
    p3 = 0 ;
Loop2:
    p3 = GeneratePredicates (p3, ix) ;
    !p3; p4 = p1 + 0;
    !p3; p5 = p2 + 0;
    ~p4; j = VectorReadInt(E,h);
    j = CopyPropagate(j,j,p4);
    ~p5; VectorWriteInt(E,i,j);
    ~p0; if (!LAT(p3)) goto Loop2;
    x += VECLEN;
Loop1Tail:
    p0 = (x < KSIZE) ;
    if ( FIRST (p0) ) goto Loop1 ;
```

*FIG. 9*

AUTO MULTI-THREADING IN MACROSCALAR COMPILERS

PRIORITY CLAIM

This application is a continuation-in-part of co-pending U.S. patent application Ser. No. 12/888,658 filed on Sep. 23, 2010.

BACKGROUND

Technical Field

This disclosure relates to processors, and more particularly to vector instruction execution during a branch misprediction of predicated branch instructions.

Description of the Related Art

Branch prediction has become commonplace in most modern processors. While backward branches may be highly predictable, forward branches may or may not be predicted well, depending on the nature of the data being processed.

Some processors that process vector instructions use masking predication when performing calculations to control whether elements in a vector are modified, or retain their unmodified value. More particularly, predicate vectors may control whether individual elements of a vector are modified. In some cases, a branch instruction may be used to branch around the predicated instructions when the predicate vector contains all zeroes. This may generally be an improvement to power and performance in situations when the branches are accurately predicted.

In a conventional vector processor when a branch is mispredicted, the processor pipeline may typically be flushed and new instructions fetched from a different address such as the branch target address. However, this type of conventional branch misprediction behavior may be unnecessary and wasteful.

SUMMARY OF THE EMBODIMENTS

The present disclosure provides system and methods for enabling the universal parallelization of software applications. To that end, systems and methods disclosed herein provide the expression of dependencies that extend a compiler's ability to parallelize functions.

In one embodiment, a compiler may examine memory and/or data dependencies within a function (a "called function") during its compilation, and express those dependencies in a dependency database. At a later point in time, another function (a "calling function") may be created such that is makes a call to the called function. During compilation of the called function, the compiler may access the dependency database to identify the dependencies of the called function. Based on the called function's dependencies, the compiler may make a decision to parallelize the calling function.

In one specific implementation, the compiler may generate a scalar version and a vector version of the called function. When compiling the calling function, the compiler may utilize the vector version of the called function in response to detecting an indication of dependency between the called function and the calling function.

In another specific implementation, in response to detecting an indication of dependency between the called function and the calling function, the compiler may generate multithreaded code corresponding to the calling function.

BRIEF DESCRIPTION OF THE DRAWINGS

FIG. 3 is a diagram illustrating an example parallelization of a program code loop.

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

FIG. 8 presents a vectorized loop from program code with memory aliasing in accordance with the described embodiments.

FIG. 9 presents a vectorized loop from program code with memory aliasing in accordance with the described embodiments.

Figure 1:
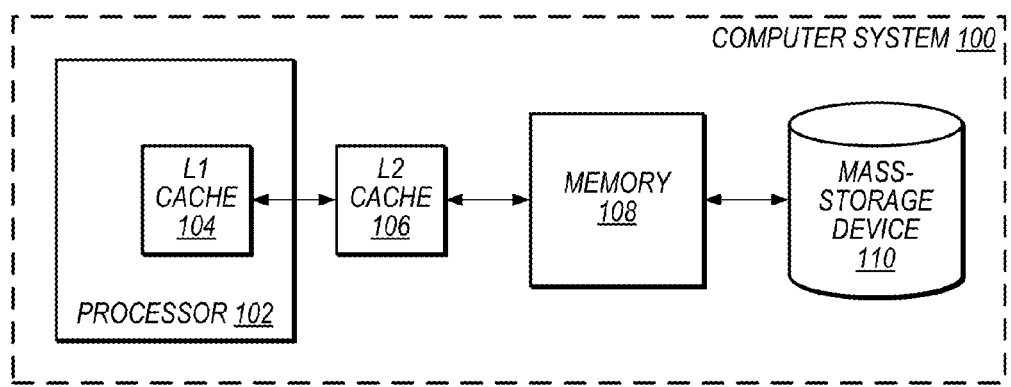
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Macroscalar Hardware and Software
Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 10, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 10, and L1 cache 104 are all examples of non-transitory computer readable storage devices.

Processor

Figure 2:
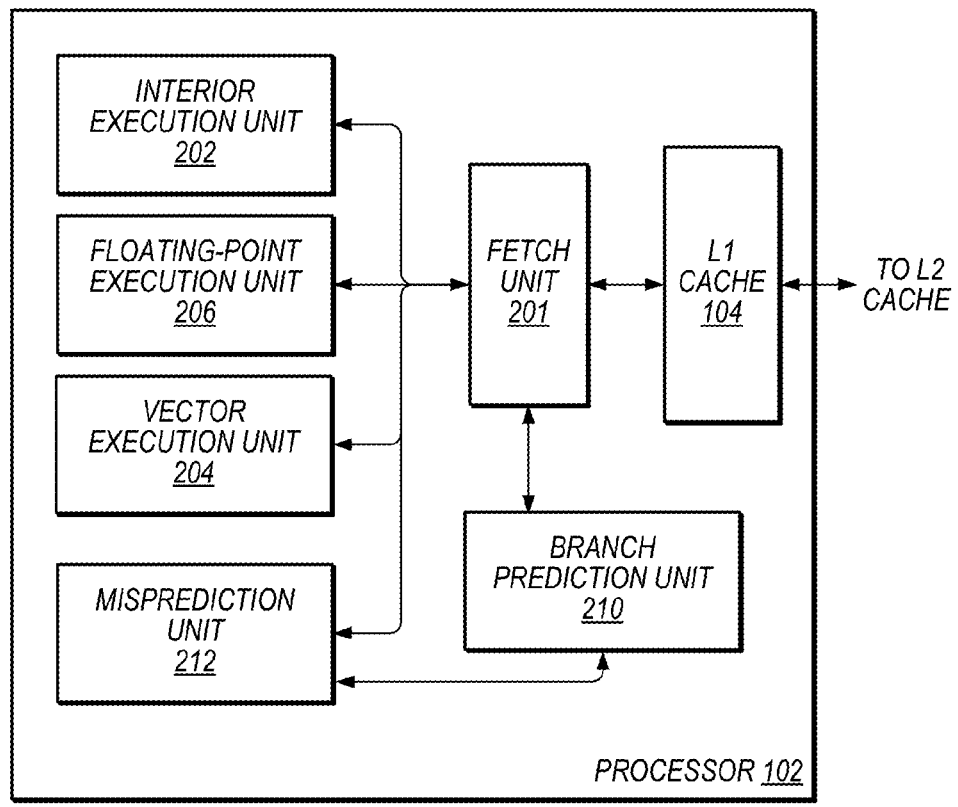
FIG. 2 is a block diagram illustrating additional details an embodiment of the processor shown in FIG. 1.
Figure 7:
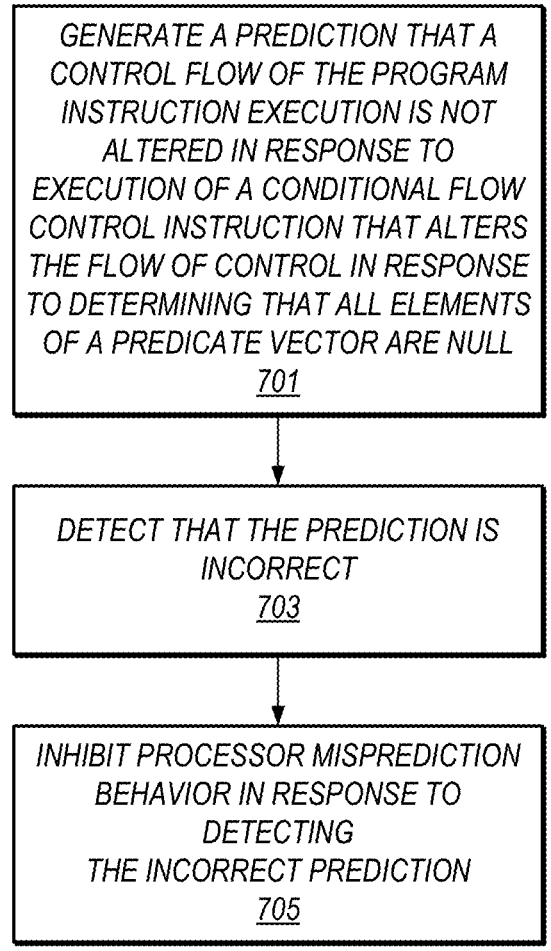
FIG. 7 is a flow diagram depicting the operation of one embodiment of the processor of FIG. 2 during a branch mispredict of a predicated branch instruction.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, a branch prediction unit 210, a misprediction unit 212, an integer execution unit 202, a floating-point execution unit 206, and a vector execution unit 204. It is noted that integer execution unit 202, floating-point execution unit 206, and vector execution unit 204 as a group may be interchangeably referred to as "the execution units."

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Integer execution units and floating-point execution units are generally known in the art and are not described further for brevity. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations stations, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, doublewords, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

In various embodiments, vector execution unit 204 may include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation (i.e., instruction, etc.) may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

In one embodiment, the branch prediction unit 210 may be configured to generate branch target program counter addresses (PCs) for the fetch unit 201 for conditional branch instructions. More particularly, for conditional branch instructions, the branch prediction unit 210 may predict whether a branch will be taken or not taken and control logic (not shown) may generate the PC for the fetch unit 201 based on the prediction. Instructions may then be fetched, issued, and executed in a speculative manner dependent upon the predicted outcome of the branch. In various embodiments, the branch prediction unit 210 may use any of variety of prediction mechanisms to generate the predictions. For example, branch prediction unit 210 may use local predictors that maintain prediction state (e.g., state machines, tables, counters, or other data structures) for individual branches, global predictors that perform prediction across multiple branches considered in the aggregate, hybrid predictors that combine elements of local and global predictors, or other suitable approaches. In some embodiments, branch prediction unit 210 may employ predictors that dynamically adapt to branch behavior that varies during execution (e.g., to detect and adapt when a branch that was better predicted according to one technique becomes better predicted according to a different technique).

In one embodiment, the misprediction unit 212 is configured to detect when a branch prediction is incorrect (e.g., that the actual behavior of a branch at the time it is executed differs from the predicted behavior of the branch, indicating that the branch was mispredicted). In addition, the misprediction unit 212 may be configured to provide an indication of the misprediction to the execution units 202, 206, and 204, as well as to the branch prediction unit 210. It is noted that although the misprediction unit 212 is shown as a separate unit, it is contemplated that in other embodiments, the misprediction unit 212 may be part of the branch prediction unit 210, or it may be part of the fetch unit 201, or it may be part of any or all of the various execution units (e.g., 202, 204, and 206).

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The actual instructions and operations are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto . . . ; // Also LAST( ), ANY( ), ALL( ),
   CARRY ( ), ABOVE( ), or NONE( ), (where ANY( ) ==
   !NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A [x]<FACTOR) is known to be always true or always false. These assumptions change when the condition is allowed to vary during execution (the common case). For simplicity in this example, we presume that no aliasing exists between A[ ] and B[ ].

Example 1

Program Code Loop

```
r = 0;
s = 0;
for (x=0; x<KSIZE; ++x)
{
```

-continued

```
if (A[x] < FACTOR)
{
r = A[x+s];
}
else
{
s = A[x+r];
}
B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=Vectorindex(Start, Increment)

Vectorindex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0, 1); // x={0 1 2 3 4 5 6 7} dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

```
Entry: dest = { 8 9 A B C D E F }
        src = { 1 2 3 4 5 6 7 8 }
       pred = { 0 0 1 1 0 0 1 0 }
Exit:  dest = { 8 9 A B 4 4 E 7 }
``` dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

```
Entry: src = { 1 2 3 4 5 6 7 8 }
      pred = { 1 0 1 1 0 0 1 0 }
Exit: dest = { 8 2 2 2 5 6 6 8 }
``` dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);                  // p1 = {00001100}
p2 = ConditionalStop(p1, kTF|kFT);  // p2 = {00004060}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:                    // i2 = { 0 0 0 0 4 0 6 0 }
p2 = 0;                              // p2 = { 0 0 0 0 0 0 0 0 }
Loop2:
p2 = GeneratePredicates(p2, i2);     // p2' = { 1 1 1 1 0 0 0 0 }
CF = 0, ZF = 0
if(!PLAST( )) goto Loop2             // p2" = { 0 0 0 0 1 1 0 0 }
                                     CF = 0, ZF = 0
                                     // p2'" = { 0 0 0 0 0 0 1 1 }
                                     CF = 1, ZF = 0
```

From an initialized predicate p2 of all zeros, GeneratePredicates generates new instances of p2 that partition subsequent vector calculations into three sub-vectors (i.e., p', p", and p'"). This enables the hardware to process the vector in groups that avoid violating the data dependencies of the loop.

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

Example 2A

Program Code Loop 1

```
j = 0;
for (x=0; x<KSIZE; ++x)
{
if (A[x] < FACTOR)
{
j = A[x+j];
}
B[x] = j;
}
```

Example 2B

Program Code Loop 2

```
j = 0;
for (x=0; x<KSIZE; ++x)
{
if (A[x+j] < FACTOR)
{
j = A[x];
}
B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

Entry: pred = { 0 0 1 0 1 0 0 0 }
Exit:  dest = { 0 0 0 0 0 1 1 1 }

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the ConditionalStop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

Memory-Based Loop-Carried Dependencies

In the previous examples, the compiler was able to establish that no address aliasing existed at the time of compilation. Such determinations are often difficult or impossible to make. The next example shows loop-carried dependencies occurring through memory (which may include aliasing) are dealt with in the illustrated embodiments of the Macroscalar architecture.

Example 3

Program Code Loop 3

```
for (x=0; x<KSIZE; ++x)
{
    r = C[x];
    s = D[x];
    A[x] = A[r] + A[s];
}
``` dest=CheckHazardP(first, second, pred)

CheckHazardP examines two vectors of a memory address (or indicies) corresponding to two memory operations for potential data dependencies through memory. The vector first holds addresses for the first memory operation, and vector second holds the addresses for the second operation. The predicate pred indicates which elements of second are to be operated upon. As scalar loop iterations proceed forward in time, vector elements representing sequential iterations appear left to right within vectors. CheckHazardP evaluates in this context. The instruction calculates a DIV representing memory hazards between the corresponding pair of first and second memory operations. The instruction correctly evaluates write-after-read, read-after-write, and write-after-write memory hazards.

As with the ConditionalStop instruction, the element position corresponding to the iteration that generates the data that is depended upon is stored in the destination vector at the element position corresponding to the iteration that is dependent upon the data. If no data dependency exists, a zero is stored in the destination vector at the element position corresponding to the iteration that does not have the dependency. For example:

```
Entry: first = { 2 3 4 5 6 7 8 9 }
       second = { 8 7 6 5 4 3 2 1 }
         pred = { 1 1 1 1 1 1 1 1 }
Exit:   dest = { 0 0 0 3 2 1 1 0 }
```

Here, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in DIV where no data dependencies exist.

In some embodiments, the CheckHazardP instruction is configured to account for various sizes of data types. However, for clarity we describe the function of the instruction using only array index types.

The example above has three memory hazards. However, in the described embodiments, only two partitions are needed to safely process the associated memory operations. Close inspection reveals that handling the first hazard on element position 3 renders subsequent dependencies on lower or equally numbered element positions moot. For example:

```
Entry Conditions:                    // DIV = { 0 0 0 0 3 2 1 0 }
                                     // p2 = { 0 0 0 0 0 0 0 0 }
p2 = GeneratePredicates(p2,DIV);     // p2 = { 1 1 1 1 0 0 0 0 }
P2 = GeneratePredicates(p2,DIV)      // p2 = { 0 0 0 0 1 1 1 1 }
```

The process used by the described embodiments to analyze a DIV to determine where a vector should be broken is shown in pseudocode below. On some embodiments, processor ?? performs this calculation in parallel. For example:

```
List = <empty>;
for (x=STARTPOS; x<VECLEN; ++x)
{
  if(DIV[x] in List)
     Break from loop;
  Else if(DIV[x]>0)
     Append <x> to List;
}
```

The vector may safely be processed in parallel over the interval [STARTPOS, x), where s ix the position where DIV[x]>0, that is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to pardon the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs can be combined using a VectorMax(A,B) instruction:

```
i2 = CheckhazardP(a,c, p0);    //i2 = { 0 0 2 0 2 4 0 0 }
i3 = CheckHazardP(b,c,p0);     //i3 = { 0 0 1 3 3 0 0 0 }
ix = VactorMax(i2,i3);         //ix = { 0 0 2 3 3 4 0 0 }
```

Because the elements of a DIV should only contain numbers less that the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 8 presents a vectorized loop from program code with memory aliasing in accordance with the described embodiments. In this example no aliasing exists between C[ ] or D[ ] and A[ ], but operations on Ap[ may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partition retain full vector size, and the partitioning loop simply falls through without iterating. However, for iterations where aliasing does occur, the partitioning loop partitions the vector to respect the data dependencies thereby ensuring correct operation.

In the example resented in FIG. ??, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this yields correct results for the cases where the first memory operation is predicated.)

FIG. 9 presents a vectorized loop from program code with memory aliasing in accordance with the described embodiments. As shown in FIG. 9, the top portion is a loop with a memory hazard on array E[ ]. The code conditionally reads and writes to unpredictable locations within the array. The vectorized Macrosalar code for this loop is shown in the bottom portion in accordance with the described embodiments.

In the vectorized loop, p1 and p2 are predicates indicating whether array E[ ] is to be read or written, respectively. The CheckHazardP instruction checks vectors of addresses (h and i) for memory hazards. The parameters p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

Compiler-based Vectorization

An Illustrative Computer System

Figure 10:
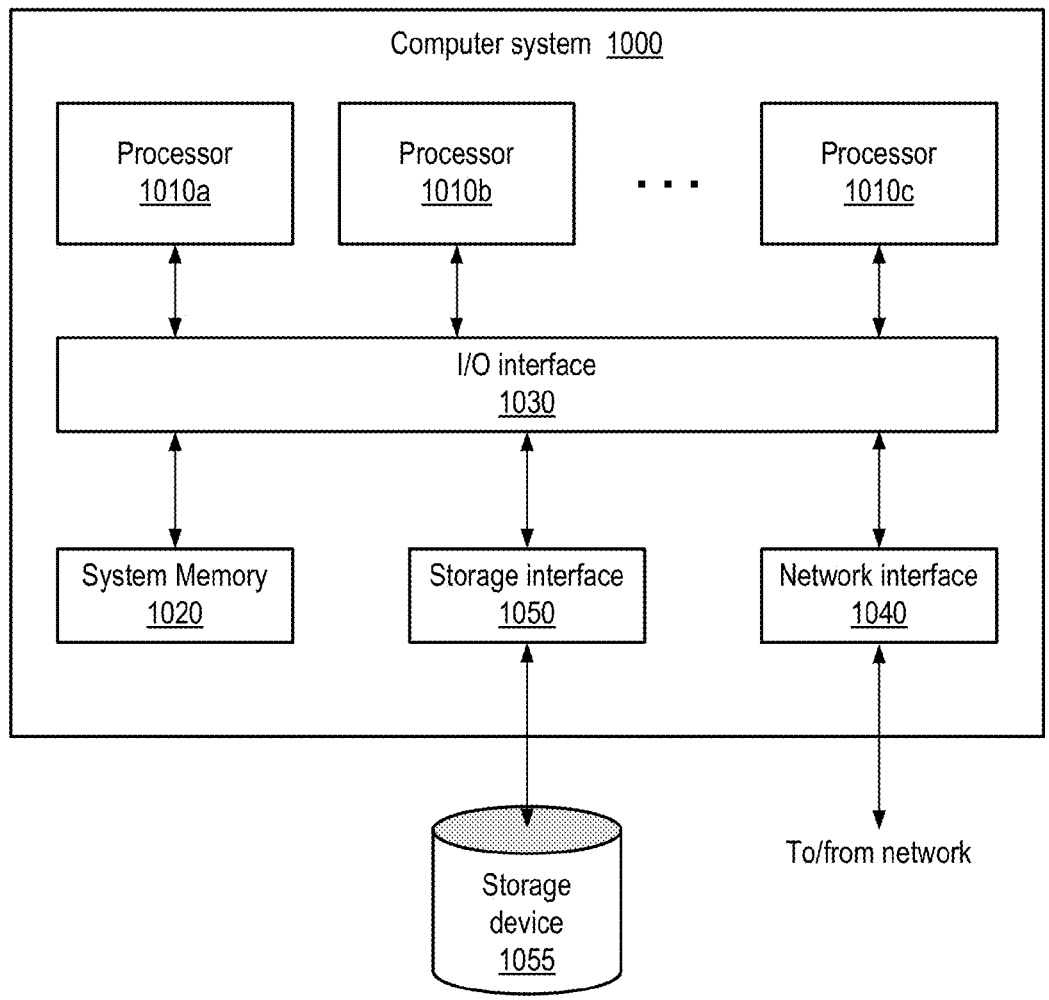
FIG. 10 is a block diagram illustrating a computer system operable to implement techniques for enabling universal vectorization of software applications according to certain embodiments.

FIG. 10 depicts an illustrative computer system operable to implement techniques for enabling universal vectorization of software applications according to certain embodiments. In this non-limiting example, computer system 100 includes one or more processors 1010a-1010n coupled to memory 1020 via I/O interface 1030. Computer system 1000 also includes network interface 1040 and storage interface 1050 coupled to I/O interface 1030. Storage interface 1050 connects external storage device 1055 to I/O interface 1030. Further, network interface 1040 may connect system 1000 to a network (not shown) or to another computer system (not shown).

In some embodiments, computer system 1000 may be a single processor system including only one processor 1010a. In other embodiments, computer system 1000 may include two or more processors 1010a-1010n. Processors 1010a-1010n may include any processor capable of executing instructions. For example, processors 1010a-1010n may be general-purpose or embedded processors implementing any suitable instruction set architectures (ISAs), such as, for example, the x86, PowerPC™, SPARC™, or MIPS™ ISAs. In an embodiment, processors 1010a-1010n may include various features of the Macroscalar processors described in U.S. Pat. No. 7,617,496 and U.S. Pat. No. 7,395,419.

System memory 1020 may be configured to store instructions and data accessible by processors 1010a-1010n. For example, system memory 1020 may be as static random access memory (SRAM), synchronous dynamic RAM (SDRAM), nonvolatile/Flash-type memory, or any other any suitable type of memory technology. A portion of the program instructions and/or data implementing desired functions or applications described in detail below may be shown stored within system memory 1020. Additionally or alternatively, a portion of those program instructions and/or data may be stored in storage device 1055, in a cache memory within one or more processors 1010a-1010n, or may arrive from a network via network interface 1040.

I/O interface 1030 is operable to manage data traffic between processors 1010a-110n, system memory 1020, and any device in or attached to the system, including network interface 1040, storage interface 1050 or other peripheral interfaces. For example, I/O interface 1030 may convert data or control signals from one component into a format suitable for use by another component. In some embodiments, I/O interface 1030 may include support for devices attached through various types of peripheral buses, such as the Peripheral Component Interconnect (PCI) bus or the Universal Serial Bus (USB), for example. Also, in some embodiments some or all of the functionality of I/O interface 1030 may be incorporated into processors 1010a-1010n.

Network interface 1040 is configured to allow data to be exchanged between computer system 1000 and other devices attached to a network, such as other computer systems, for example. For example, network interface 1040 may support communication via wired or wireless general data networks, telecommunications/telephony networks, storage area networks such as Fibre Channel SANs, and the like.

Storage interface 1050 is configured to allow computer system 1000 to interface with a storage device such as storage device 1055. Storage interface 1050 may support standard storage interfaces such as one or more suitable versions of the Advanced Technology Attachment Packet Interface (ATAPI) standard (which may also be referred to as Integrated Drive Electronics (IDE)), the Small Computer System Interface (SCSI) standard, the IEEE 1394 "Firewire" standard, the USB standard, or another standard or proprietary interface suitable for interconnecting a mass storage device with computer system 1000. For example, storage device 1055 may include magnetic, optical or solid state media that may be fixed or removable. Storage device 1055 may also correspond to a hard disk drive or drive array, a CD or DVD drive, or a nonvolatile memory (e.g., Flash)-based device.

System memory 1020 and storage device 1055 represent illustrative embodiments of a computer-accessible or computer-readable storage medium configured to store program instructions and data. In other embodiments, program instructions and/or data may be received, sent or stored upon different types of computer-accessible media. In general, a computer-accessible medium or storage medium may include any type of mass storage media or memory media such as magnetic or optical media. A computer-accessible medium or storage medium may also include any volatile or non-volatile media such as RAM (e.g. SDRAM, DDR SDRAM, RDRAM, SRAM, etc.), ROM, or the like, whether included in computer system 1000 as system memory 1020 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

Typically, computer system 1000 may take the form of a desktop or laptop computer. As will be readily understood in light of this disclosure, however, computer system 1000 may be any suitable device capable of executing software. For example, computer system 1000 may be a tablet computer, a phone, or the like.

An Illustrative Compiler

Generally speaking, a compiler may correspond to a software application (e.g., one or more modules of computer-executable instructions) that is configured to translate or transform source code, which may be represented in a high-level programming language such as C, C++ or any other suitable programming language, into object code. The language in which the source code is expressed may be referred to as the source code language or simply the source language. Typically, object code may be represented in the form of instructions and data suitable for processing by a target computing architecture, although in some embodiments, additional processing (e.g., linking) may be performed on generated object code to transform object code into machine-executable code. In various embodiments, such additional processing may be performed by a compiler or by separate applications.

Object code may be represented in machine-readable form (e.g., binary form), in human-readable form (e.g., assembly language) that may require additional processing to generate machine-readable code, or in a combination of human- and machine-readable forms. The target architecture for the object code may be the same as the ISA implemented by processors 1010a-1010n on which the compiler is configured to execute. However, in some instances, a compiler may be configured to generate object code for a different ISA than the ISA on which the compiler executes (a "cross-compiler").

Figure 11:
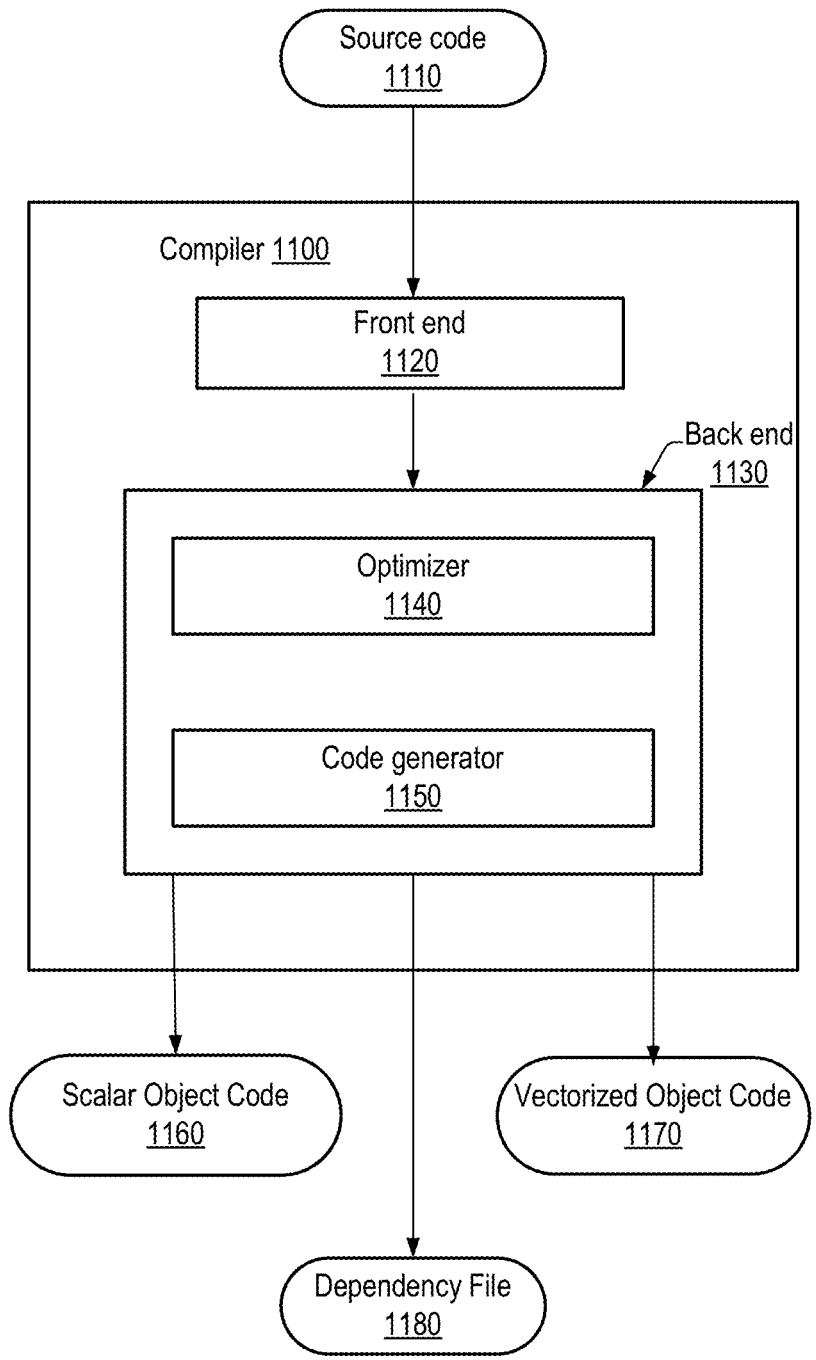
FIG. 11 is a block diagram illustrating a compiler that, when executed by a computer system, may generate executable code according to certain embodiments.

FIG. 11 depicts an illustrative compiler that, when executed by computer system 1000 or another suitable computer system, may generate executable code according to certain embodiments. Compiler 1100 includes front end 1120 and back end 1130, which may in turn include optimizer 1140 and code generator 1150. As shown, front end 1120 receives source code 1110 and back end 1130 produces object code such as, for example, scalar object code 1160, vectorized object code 1170, or a combination thereof. Compiler 1100 may also produce dependency database 1180 associated with one or more of object codes 1160 and/or 1170.

While source code 1110 is typically written in a high-level programming language, source code 1110 may alternatively correspond to a machine-level language such as assembly language. For example, compiler 1100 may be configured to apply its optimization techniques to assembly language code in addition to code written in higher-level programming languages. Also, compiler 1100 may include a number of different instances of front end 1120, each configured to process source code 1110 written in a different respective language and to produce a similar intermediate representation for processing by back end 1130. In such embodiments, compiler 1100 may effectively function as a multi-language compiler.

In an embodiment, front end 1120 may be configured to perform preliminary processing of source code 1110 to determine whether the source is lexically and/or syntactically correct, and to perform any transformation suitable to ready source code 1110 for further processing by back end 1130. For example, front end 1120 may be configured to process any compiler directives present within source code 1110, such as conditional compilation directives that may result in some portions of source code 1110 being included in the compilation process while other portions are excluded. Front end 1120 may also be variously configured to convert source code 1110 into tokens (e.g., according to whitespace and/or other delimiters defined by the source language), determine whether source code 1110 includes any characters or tokens that are disallowed for the source language, and determine whether the resulting stream of tokens obeys the rules of syntax that define well-formed expressions in the source language. In different situations, front end 1120 may be configured to perform different combinations of these processing activities, may omit certain actions described above, or may include different actions, depending on the implementation of front end 1120 and the source language to which front end 1120 is targeted. For example, if a source language does not provide a syntax for defining compiler directives, front end 1120 may omit a processing action that includes scanning source code 1110 for compiler directives.

If front end 1120 encounters errors during processing of source code 1110, it may abort processing and report the errors (e.g., by writing error information to a log file or to a display). Otherwise, upon sufficiently analyzing the syntactic and semantic content of source code 1110, front end 1120 may provide a intermediate representation of source code 1110 to back end 1130. Generally speaking, this intermediate representation may include one or more data structures that represent the structure and semantic content of source code 1110, such as syntax trees, graphs, symbol tables or other suitable data structures. The intermediate representation may be configured to preserve information identifying the syntactic and semantic features of source code 1110, and may also include additional annotation information generated through the parsing and analysis of source code 1110. For example, the intermediate representation may include control flow graphs that explicitly identify the control relationships among different blocks or segments of source code 1110. Such control flow information may be employed by back end 1130 to determine, for example, how functional portions of source code 1110 may be rearranged (e.g., by optimizer 1140) to improve performance while preserving necessary execution-ordering relationships within source code 1110.

Back end 1130 may generally be configured to transform the intermediate representation into one or more of scalar code 1160, vectorized code 1170, or a combination of both. Specifically, in the illustrated embodiment, optimizer 1140 may be configured to transform the intermediate representation in an attempt to improve some aspect of the resulting scalar code 1160 or vectorized code 1170. For example, optimizer 1140 may be configured to analyze the intermediate representation to identify memory or data dependencies. In some embodiments, optimizer 1140 may be configured to perform a variety of other types of code optimization such as vectorization, loop optimization (e.g., loop fusion, loop unrolling, etc.), data flow optimization (e.g., common subexpression elimination, constant folding, etc.), or any other suitable optimization techniques. Optimizer 1140 may also be configured to generate dependency database 1180. As described in greater detail below, dependency database 1180 may express an indication of a memory and/or data dependency within source code 1110. Additionally or alternatively, in connection with the vectorization of source code 1110, dependency database 1180 may expose a vector interface associated with vectorized object code 1170.

Code generator 1150 may be configured to process the intermediate representation, as transformed by optimizer 1140, in order to produce scalar code 1160, vectorized code 1170, or a combination of both types of code. For example, code generator 1150 may be configured to generate vectorized machine instructions defined by the ISA of the target architecture such that execution of the generated instructions by a processor implementing the target architecture (e.g., one of processors 1010a-1010n, or a different processor) may implement the functional behavior specified by source code 1110. In an embodiment, code generator 1150 may also be configured to generate instructions corresponding to operations that may not have been inherent in source code 1110, but which may have been added by optimizer 1140 during the optimization process.

In other embodiments, compiler 1100 may be partitioned into more, fewer or different components than those shown. For example, compiler 1100 may include a linker (not shown) configured to take one or more object files or libraries as input and combine them to produce a single—usually executable—file. Alternatively, the linker may be an entity separate from compiler 1100. As noted above, any of the components of compiler 1100, and any of the methods or techniques performed thereby including those described below with respect to FIGS. 12-15, may be implemented partially or entirely as software code stored within a suitable computer-accessible storage medium.

Source code 1110 may represent, for example, a software function or algorithm. The resulting object code 1160 and/or 1170 may be, for example, a library or external function that can be called by other functions. Illustrative techniques employed by compiler 1100 during operation, and in particular during its vectorization operation, are discussed in more detail below.

Vectorization of Non-Leaf Loops

Many modern computers have the capability of performing some type of parallel processing of a computational workload by concurrently executing two or more different operations. For example, a superscalar processor may allow a computer to attempt to execute multiple independent instructions at once. Another technique generally referred to as "vector computing" (which may be considered to be a special case of parallel computing) allows a computer to attempt to execute a single instruction that operates on multiple data items at once. Various examples of vector computing can be found in the single instruction, multiple data (SIMD) instruction sets now available in various processors, including, for example, IBM's AltiVec™ and SPE™ instruction set extensions for PowerPC™ processors and Intel's variants of MMX™ and SSE™ instruction set extensions. Such SIMD instructions are examples of vector instructions that may be targeted by a vectorizing compiler, although other types of vector instructions or operations (including variable-length vector operations, predicated vector operations, vector operations that operate on combinations of vectors and scalars/immediates) are also possible and contemplated.

Generally speaking, the process of transforming source code into vectorized object code may be referred to as "vectorization." When performed using a compiler (as opposed to, for example, vectorizing source code by hand), vectorization may be referred to as "compiler auto-vectorization." One particular type of auto-vectorization is loop auto-vectorization. Loop auto-vectorization may convert procedural loops that iterate over multiple data items into code that is capable of concurrently processing multiple data items within separate processing units (e.g., processors 1010a-1010n of computer system 1000 in FIG. 10, or separate functional units within a processor). For example, to add together two arrays of numbers A[ ] and B[ ], a procedural loop may iterate through the arrays, adding a pair of array elements during each iteration. When compiling such a loop, a vectorizing compiler might take advantage of the fact that the target processor implements vector operations capable of concurrently processing a fixed or variable number of vector elements. For example, the compiler might auto-vectorize the array-addition loop so that at each iteration, multiple elements of arrays A[ ] and B[ ] are concurrently added, reducing the number of iterations needed to complete the addition. A typical program spends a significant amount of its execution time within such loops. As such, auto-vectorization of loops can generate performance improvements without programmer intervention.

In some embodiments, compiler auto-vectorization is limited to leaf loops—i.e., loops that do not make calls to other functions. Vectorization of non-leaf loops—i.e., those that make calls to other functions—is ordinarily very difficult because the side-effects of external functions calls are usually opaque, especially when their source-code is unavailable for inter-procedural analysis, such as is the case with libraries, for example. For purposes of illustration, consider the following loop:

```
for(x=0; x<size; ++x)
{
    A[x]=x;
    foo (x)
}
```

To vectorize this loop, compiler 1100 may determine whether function foo( ) interacts with (e.g., reads or writes) array A[ ]. Here, three possibilities exist: (1) function foo( ) does not interact with A[ ]; (2) function foo( ) does interact with A[ ]; or (3) function foo( ) might interact with A[ ] (e.g., depending on a compile-time or run-time condition, foo( ) may or may not interact with A[ ]). The case where function foo( ) might interact with A[ ] presents similar problems as the case where function foo( ) does in fact interact with A[ ]. In the case where there is no interaction between foo( ) and A[ ], then the vectorizable code below is equivalent to the loop above:

```
for (x=0; x<size; ++x)
    A[x] = x;
for (x=0; x<size; ++x)
    foo(x);
```

This example shows that, in the process of vectorizing the non-leaf loop, compiler 1100 would benefit from knowing the memory that function accesses and/or whether that memory is read and/or written. Because the majority of loops typically contain function calls within them, the vectorization of non-leaf loops and the functions called by them is preferred for high degrees of vectorization. To enable this level of vectorization, various embodiments of the techniques and systems described herein increase the compile-time visibility of dependencies and potential dependencies across libraries and modules that may have been previously compiled. For example, this information may be available when the calling function is compiled, independently of when (or where) the library or module was originally compiled. Accordingly, certain techniques described herein establish an illustrative compiler infrastructure to create this visibility and explore the types of vectorization enabled by it.

Dependency Databases

When compiling code that calls an external function, it may be desirable to determine the interface of the external function (e.g., the number and/or types of parameters the external function takes, and/or the number and/or types of results it returns). For example, such interface information may be useful in determining whether the calling code has correctly implemented the external function. Externally callable functions may typically expose their interface definitions in header files. However, such header files may not expose the details of variables that are not part of an external function's interface to a calling function, but which may nevertheless affect code vectorization. For example, in the loop illustrated above, vectorization of the for-loop may depend on how function foo( ) interacts with array A[ ]. However, because foo( ) does not take A[ ] as a parameter, the header file corresponding to foo( ) may not adequately indicate this dependency to compiler 1100.

A dependency database, which may also be referred to herein as a "persistent dependency database," may describe the dependencies of externally callable functions in a library. That is, a dependency database may expose to a calling function various dependencies of a called function that are not necessarily apparent from the called function's interface alone. This database may be accessed when functions that call a library are compiled. Generally speaking, a dependency database may persistently store indications of the dependencies of callable code such that the dependencies are visible across compiler invocations. For example, in some embodiments, a dependency database may be implemented as a dependency file (analogous to a header file) that includes human-readable and/or machine-readable content indicative of various dependencies. In other embodiments, a dependency database may be implemented using other techniques, such as by using a table-based relational database, semi-structured data (e.g., formatted using Extensible Markup Language (XML)), or any other suitable technique. For simplicity of exposition, the following discussion makes reference to an embodiment that employs a dependency file. However, it should be noted that this is merely an non-limiting example of a dependency database.

In an embodiment, compiler 1100 automatically accesses a dependency file (if it exists) upon inclusion of a corresponding header file (e.g., stdlib.h). This mechanism may allow vectorizing compilers such as, for example, Macroscalar compilers to compile existing code without modification while having the advantage of knowing the dependencies of external libraries. Compiler 1100 may then generate dependency files automatically when libraries are compiled.

Information contained in a dependency file may form an Application Compiler Interface (ACI) that provides information which compiler 1100 can use to understand the constraints of a function. Specifically, dependency files may express information about variables that are not normally within the scope of a calling function. For example, the variables expressed in a dependency file may include data items that are not parameters of the called function (that is, such variables may not be defined by a called function's programming interface as parameters of the called function). Through the use of dependency files, a calling function may become aware of whether a called function reads or writes function-static or file-static variables, for example. Dependency files may also allow compiler 1100 to differentiate between variables that share the same name but have different scopes.

As a non-limiting example, when a library stdlib is compiled, a compiler would ordinarily only generate object file stdlib.o. Using the techniques described herein, compiler 1100 may also generate dependency file stdlib.d, for example, at compile-time. Dependency file stdlib.d exposes memory dependencies associated with public functions defined in stdlib.h. Other programs that include stdlib.h from their source code may trigger compiler 1100 to search for the associated dependency file stdlib.d in corresponding locations. This dependency file may be distributed and installed along with stdlib.h and stdlib.o. In one implementation, the absence of a dependency file would mean that no additional information about the library is available, which might be the default state for legacy libraries and would not cause any compile errors.

Dependency databases may enable vectorization of non-leaf loops by exposing the data dependency characteristics of a previously-compiled library function (or any function in a program) in a manner that is visible to compiler 1100 when the code that calls the library function is compiled. This information may be made available without revealing the source-code for the library.

In some embodiments, the dependency information may be generated at compile-time of the library. For example, for each function that is compiled, compiler 1100 may note the types of accesses to function static variables, file static variables, global variables, and/or pointers passed in to the function being compiled. Compiler 1100 may then record which symbols were read or written, and export this information in the form of a dependency file that can be accessed and used at the compile-time of other code that references the library.

As another non-limiting example, if the function foo( ) is defined in file foo.c and its interface is defined in the header file foo.h, then at the compile time of foo.c, the memory dependency characteristics of function foo( ) may be stored into dependency file foo.hd. (It is noted that any suitable naming convention for dependency files may be employed.) A calling function that uses function foo( ) may include header file foo.h, but may have no access to file foo.c. At the time that foo.h is referenced during compilation of the calling function, compiler 1100 may automatically search for the dependency file foo.hd to see whether it exists. Because the existence of dependency file foo.hd is optional, the absence of this file may imply that the dependency characteristics of functions defined in file foo.h are unknown, thus suggesting compiler 1100 should make pessimistic assumptions when vectorizing the calling function. If the dependency file exists, however, compiler 1100 can use the dependency information in this file to make more accurate and aggressive assumptions using the dependency characteristics contained therein during vectorization of the calling function.

Figure 12:
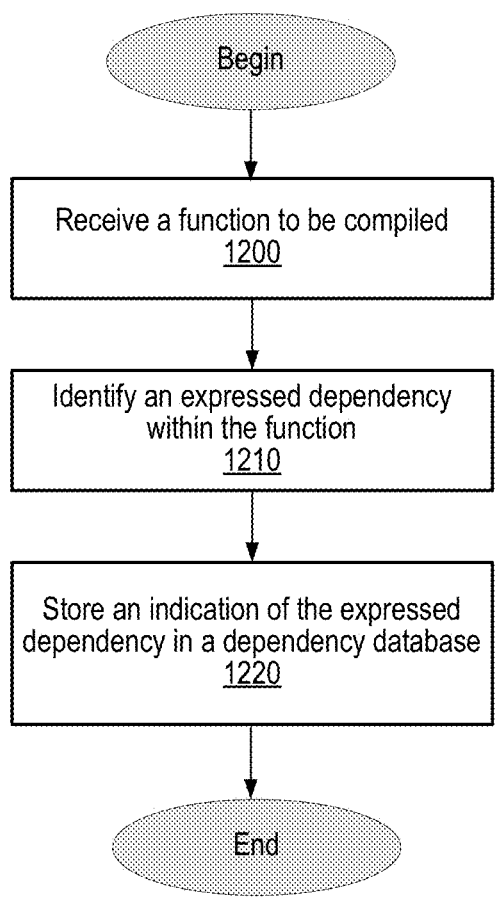
FIG. 12 shows a flow diagram illustrating a method of expressing a dependency in a dependency database according to certain embodiments.

Referring to FIG. 12, a flowchart representing a method of expressing a dependency in a dependency file is depicted according to certain embodiments. In block 1200, compiler 1100 receives a function to be compiled. For example, compiler 1100 may receive the function when processing source code for compilation, such as during compilation of a library that includes the function. In block 1210, compiler 1100 analyzes the function and identifies an expressed dependency within the function. This expressed dependency may be, for example, a memory or data dependency associated with a data item that is not a parameter of the called function. More generally, an expressed dependency of a function with respect to a particular data item may indicate whether the function only reads the particular data item, only writes the particular data item, or both reads and writes the particular data item. In various embodiments, analysis of the function may include activities such as performing a lexical, syntactic, and/or semantic analysis of the function. Analysis may also include generating a parse tree, symbol table, intermediate-code representation, and/or any other suitable data structure or representation that is indicative of some aspect of the operations and/or data references of the code being compiled.

In block 1220, compiler 1100 stores an indication of the expressed dependency in a dependency database associated with the function. For example, during analysis of the function, compiler 1100 may identify variables used by the function that are not necessarily local or private to that function, and thus are capable of being read or written by code that is external to the function. Such variables may be examples of expressed dependencies that compiler 1100 might identify, and compiler 1100 may store indications of these variables within a dependency database. (It is noted that in some embodiments, compiler 1100 may also identify and indicate dependencies that are local or private to the function.) In various embodiments, the indication of an expressed dependency may include information that identifies the expressed dependency, such as a name of the variable depended upon. The indication may also include information that characterizes the expressed dependency, such as information regarding whether the function reads or writes the variable, and/or information regarding the data type or scope of the variable (e.g., whether the variable is global, private, static, etc.). As will be readily apparent in light of this disclosure, the dependency file may be created or updated in any suitable format such as, for example, Extensible Markup Language (XML), or the like. Moreover, in some embodiments, dependencies may be indicated in a negative fashion instead of or in addition to an affirmative fashion. For example, a dependency file may explicitly indicate that a given variable is not dependent on external code, in addition to or instead of indicating those expressed dependencies that do exist.

For instance, consider the example below, where func1.c is to be compiled:

```
// --- File func1.c ---
int A[1000]; // Global array A
int F[1000]; // Global array F
#include <foo1.h>
int func1 (int b)
{
int x,c;
c = 0;
for (x=0; x<100; ++x)
{
c = c + foo1(x) + A[x+b] ;
F[x] = c
}
return(c);
}
```

In this case, func1.c makes a call to external function foo1.c, shown below:

```
// --- File foo1.c ---
int foo1(int d)
{
static int e = 0;
e = e + d;
return(e);
}
```

The source code for called function foo1.c is reproduced for illustration purposes only. It is understood that, so long as a dependency database (in this example, a dependency file) exists for foo1.c, its source code need not be available during compilation of calling function func1.c. In this example, the expressed dependency information stored in the dependency file foo1.hd, which may have been generated at the time when file foo1.c is compiled, may express the fact that the function static variable "e" is both read and written. As such, one non-limiting example of a corresponding dependency file is shown below:

```
// --- File foo1.hd ---
function foo1(void)
{
read e;
write e;
}
```

At the compile time of file func1.c, the inclusion of header file foo1.h may cause the dependency file foo1.hd to be read by compiler 1100. This information informs the compiler of the expressed dependencies of called function foo1( ) i.e., that static variable "e" is read and written. This also allows compiler 1100 to detect that even though they are used in calling function func1( ) global variables "A" and "F" are not referenced by called function foo1( ). This knowledge allows compiler 1100 to vectorize the loop in function func1( ) because it can determine that parallelism will not cause incorrect operation. In this case, the loop in func1( ) would call foo1( ) once for each element in the vector being processed.

If function foo1( ) wrote to global "A," then compiler 1100 might not vectorize the loop in func1( ) or it might use the information to vectorize only a portion of the function. In this instance, the compiler may, for example, serialize the call to function foo1( ) and the memory reference to "A," while allowing the rest of the loop to execute in a parallel manner.

Figure 13:
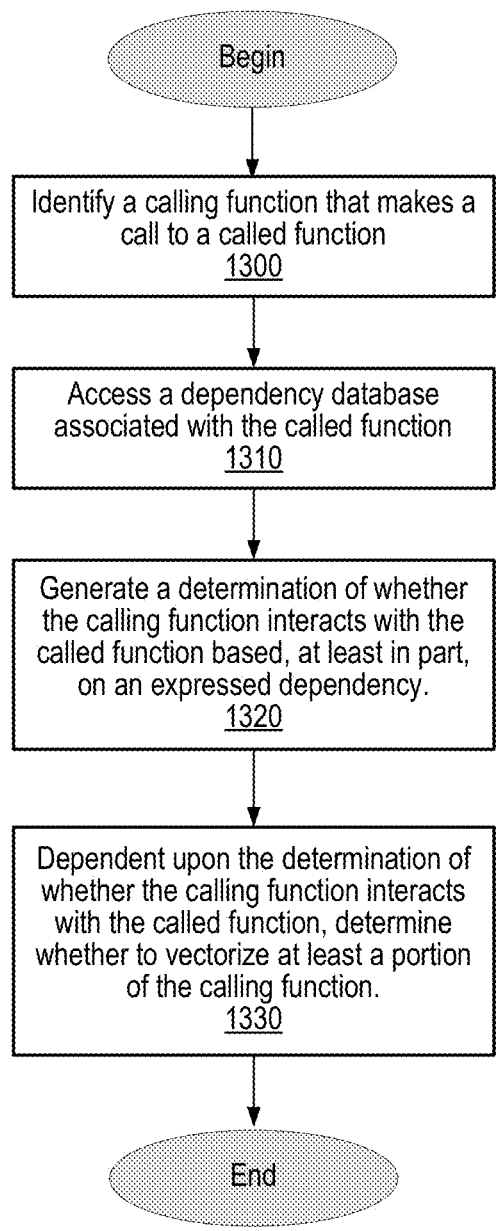
FIG. 13 shows a flow diagram illustrating a method of vectorizing a function according to certain embodiments.

Referring to FIG. 13, a flowchart representing an embodiment of a method of vectorizing a function is depicted. In block 1300, compiler 1100 identifies a calling function. In a non-limiting embodiment, the calling function may include a non-leaf loop, in which case the calling function may include a call to an external or called function. Referring to the code example just given, compiler 1100 may process the func1.c source code and identify the func1( ) function as a calling function that includes a non-leaf for loop that calls the foo1( ) function.

In block 1310, compiler 1100 may attempt to access a dependency database associated with the called function. In some instances, a dependency database (e.g., a dependency file) may be explicitly indicated to compiler 1100, for example via a command-line parameter, a compiler directive embedded within source code, or via another suitable technique. In other instances, compiler 1100 may attempt to infer the name of a dependency file from other data according to a naming convention. For example, if a header file is included within source code, compiler 1100 may search for a dependency file that is derived from the name of the header file. In some embodiments, compiler 1100 may search for dependency files based on the name of the called function.

If the dependency database exists, it may indicate an expressed dependency within the called function. This expressed dependency may be, for example, a memory or data dependency associated with an data item that is not a parameter of the called function, as discussed above. In some instances, compiler 1100 may check a number of different naming conventions to determine whether or not a dependency file exists.

In block 1320, compiler 1100 then determines whether the calling function interacts with the called function based, at least in part, on the expressed dependency (or the absence of a dependency). For example, upon accessing the dependency file associated with function foo1( ) compiler 1100 may determine that foo1( ) depends on variable "e" but not variables "A" or "F." Thus, compiler 1100 may determine that calling function func1( ) does interact with called function foo1( ), at least with respect to variable "e."

In block 1330, dependent upon the determination of whether the calling function interacts with the called function, compiler 1100 may determine whether to vectorize at least a portion of the calling function. For example, based on the expressed dependency information discussed above, compiler 1100 may attempt to vectorize calling function func1( ) by generating vector code that concurrently operates on multiple data items (e.g., array elements) and/or multiple loop iterations.

In various embodiments, a dependency database may express various types of information that may be useful to compiler 1100 in determining whether to vectorize a function. Examples include tracking reads and writes to data objects, pointers, pointed-to data objects, known offsets within pointed-to objects, unknown offsets into pointed-to objects (which may effectively constitute a reference to the entire object), variable offsets within objects (both pointed-to and data objects, which may enable run-time dependency analysis using the variable in question), and known offsets into objects of unknown offset into a higher-level object (e.g., when an unknown number of known offsets are referenced, but other offsets remain unreferenced).

Known offset information may enable compiler 1100 to vectorize without generating additional dependency-checking instructions, while variable offset information may be used to generate dependency-checking instructions that analyze the variable dependencies at run-time, which may allow increased vector parallelism to be achieved while still maintaining program correctness.

As explained above, a dependency database may express information about a called function that is useful to compiler 1100 when vectorizing a calling function. In that regard, a dependency database may store information such as the type of memory access, the addressing mode, and/or additional qualifiers.

In some embodiments, memory accesses by a function generally fall into two types: reads and writes. Thus, as shown in the examples given above, a dependency database may explicitly store indications of whether a data item is read or written.

Addressing modes describe memory accesses within a called function as viewed by the calling function. Some embodiments may define three addressing modes: constant, variable, and unknown, though alternative embodiments are possible and contemplated. Each of these three addressing modes may be determined by whether addressing can be established by the compiler at compile time, by the calling function at run time, or by the called function at run time, respectively. In addition, some embodiments may define two orthogonal qualifiers to the addressing modes: public and private. These designate whether the associated variable is visible to external modules.

According to some embodiments, constant addressing describes addressing that can be resolved from outside the module at compile time. This includes references to named variables, named structure elements within a named structure, or array indexes that can be resolved at compile time. For example, g (a named variable), str.g (a named structure element within a named structure), h[5] (an array indexed by a constant), and str[5].h (a named structure element within a named array of structures indexed by a constant) represent examples of constant addressing. These examples can represent either static or global variables. (Automatic storage is usually temporal—for example, allocated upon entry to a module and deallocated upon the module's exit—and thus not generally visible outside of the module.) The example below illustrates dependencies for a function that uses constant addressing:

```
function foo(void)
{
writepublic h[5];
readpublic g;
};
```

In some embodiments, variable addressing describes addressing that is not constant but also not modified by the called function. Therefore, it may be evaluated by the calling function at run time. Examples include references to pointed-to objects and to arrays where the addressing may be observed by the calling function. Consider the function below:

```
static int A[1000]; // file-static variable, not
exported
```

```
void assignA (int g, int x)
{
A[g] = A[x];
};
```

This function would export the following dependencies to the dependency file, declaring that the function writes A[g] and reads A[x]—both variably-addressed arrays:

```
void assignA (g,x)
{
write private A[g];
read private A[x];
};
```

In this example, dependency checking (which may also be referred to as hazard checking) may be unnecessary if the function assignA( ) is called only once per iteration of the calling loop. The called function assignA( ) may determine whether g and x overlap and may partition the vector accordingly, for example, using Macroscalar techniques.

Consider the situation where an external loop invokes assignA( ) twice per iteration:

```
for (x=. . .)
{
assignA (g1,x);
assignA (g2,y);
}
```

Although hazards may exist between g1 versus x, or g2 versus y, these dependencies are pertinent to a single invocation of the function. In this particular instance, the calling loop may check for potential hazards only between g1 versus y, and g2 versus x, which it can recognize from the information in the dependency file.

In some embodiments, unknown addressing is similar to variable addressing as described above, but typically applies to situations where the run-time addressing cannot be evaluated by the calling function. This may happen, for example, in situations where the called function modifies the values of address variables in a manner that is not visible to the calling function using information from the dependency file.

Additional qualifiers "public" and "private" may designate whether a linker exports a symbol to allow the variable to be inspected by calling functions. For example, the references to A[ ] in the next to last example given above are designated "private," because A[ ] is declared as a file-static variable not exported to functions that call assignA( ). In this example, compiler 1100 can determine from the dependency information how the assignA( ) function addresses A[ ], but may not be able to generate code that actually reads values of A[ ].

Full-Function Vectorization

As described in detail above, compiler auto-vectorization may be employed to generate vectorized code from nonvectorized source code in a manner that may be transparent to programmers or other users. Such compiler auto-vectorization may enable source code to take advantage of performance improvements offered by vector computing hardware with little or no programmer intervention.

However, if non-leaf functions (i.e., functions that call other functions) are to be effectively vectorized, it may be desirable to provide versions of called functions that expose a vector interface to the calling function, rather than the scalar interface that might be represented in the original source code.

Moreover, an application developer might wish to target an application to a variety of computing platforms, not all of which may offer vector resources. For example, a mobile version of a processor family might omit vector operations to reduce die size and power consumption, whereas a desktop version of the same processor family might be developed to emphasize processing power over power consumption. In this scenario, in order to execute on the mobile processor, an application might need to be compiled using only scalar functions, whereas the application might use either scalar or vector functions when executing on the desktop processor. However, as with the auto-vectorization described above, it may be desirable to allow the application to efficiently execute on vector and non-vector platforms while reducing or eliminating programmer intervention.

Correspondingly, when vectorizing a function, a compiler according to some embodiments described herein may generate both scalar and vector versions of the function from a single source code description. The function may be, for example, a library function, though more generally, it may correspond to any callable procedure or method. In some embodiments, the scalar version of the function may use a scalar interface as originally specified by the source code. Meanwhile, the vector version of the function may implement a vector interface to the function, accepting vector parameters and/or generating vector return values. By generating both scalar and vector versions of the function, the compiler may enable code to be more flexibly tailored to the available resources, either at compile or run time. Moreover, by generating a vectorized version of a called function and exposing the resulting vector interface to calling functions, the compiler may facilitate the vectorization of calling functions, thus propagating opportunities for vectorization hierarchically upwards from leaf functions.

The vector interface may be expressed, for example, in a dependency database associated with the function, such as a dependency file. For example, consider the following function shell, in which internal details of the function have been omitted:

```
int foo(int A)
{
int B;
// function code return(B);
}
```

A scalar interface for this function may be represented (e.g., within a dependency file) as:
int foo (int A)
This representation reflects that according to this version, foo( ) takes a scalar parameter and returns a scalar result.

The same function, when vectorized to perform operations on multiple data items at a time, for example, may become:

```
Vector foo(Vector A)
{
Vector B;
// function code return(B);
}
```

As such, a vector interface for this function may be represented (e.g., within a dependency file) as:
Vector foo(Vector A)
Unlike the prior representation, this representation indicates that this version of foo( ) takes a vector parameter and returns a vector result.

Figure 14:
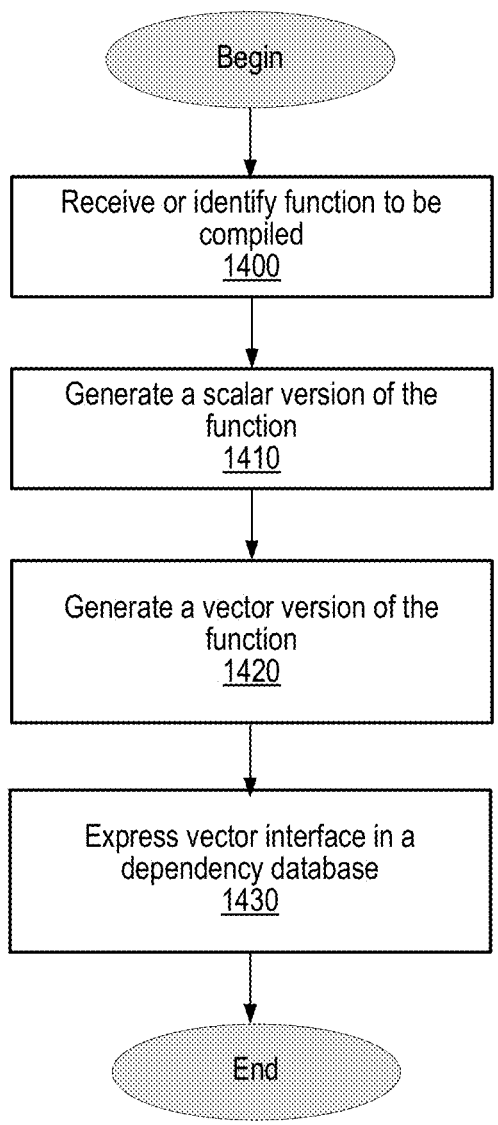
FIG. 14 shows a flow diagram illustrating a full function vectorization method according to certain embodiments.

Referring to FIG. 14, a flowchart representing an embodiment of a full-function vectorization method is depicted. In block 1400, compiler 1100 receives a function to be compiled. In block 1410, compiler 1100 may compile a scalar version of the function. In block 1420, compiler 1100 may compile a vector version of the function. And in block 1430, compiler 1100 may express a vector interface associated with the vector version of the function in a dependency database.

The presence of this alternate vector interface allows compiler 1100 to make vector function calls from within vectorized loops, rather than making multiple serialized scalar function-calls from within a vectorized loop. For example, consider the following loop within a calling function that makes a call to external function foo( ):

```
for(x=0; x<512; ++x)
{
    C[x]=D[x];
    foo (C);
}
```

If foo( ) had only a scalar interface, the opportunities for vectorizing this loop might be limited, e.g., to vectorization of the assignment. However, the presence of a vector version of foo( ) may increase opportunities for loop vectorization. For example, a vectorized version of the above loop might call foo( ) using vector parameters and might receive vector results, enabling more concurrent execution and reducing serialization within the loop. Furthermore, unlike previous approaches, this technology permits the vectorization of functions that do not contain loops. This may increase the amount of overall vectorization in applications.

Loops in both versions of a function may be vectorized. Generally speaking, "horizontal" vectorization may refer to a type of vectorization in which iterations of a loop are mapped to corresponding elements of a vector. "Vertical" vectorization may refer to a type of vectorization in which the iterative nature of a loop may be preserved (i.e., as opposed to being mapped to vector elements as in horizontal vectorization), but in which scalar variables are replaced with vector variables, such that each iteration concurrently operates on more data than the scalar version of the code.

Loops in the scalar version of the function can be vectorized horizontally using Macroscalar techniques, while loops in the vector version of the function can be vectorized either horizontally or vertically. This may increase the opportunities for vectorization in applications. In addition to the performance and efficiency benefits of vectorizing function calls, this technology may increase the number of loops that are vertically vectorized in an application, thus reducing the overhead caused when loops are horizontally vectorized.

Figure 15:
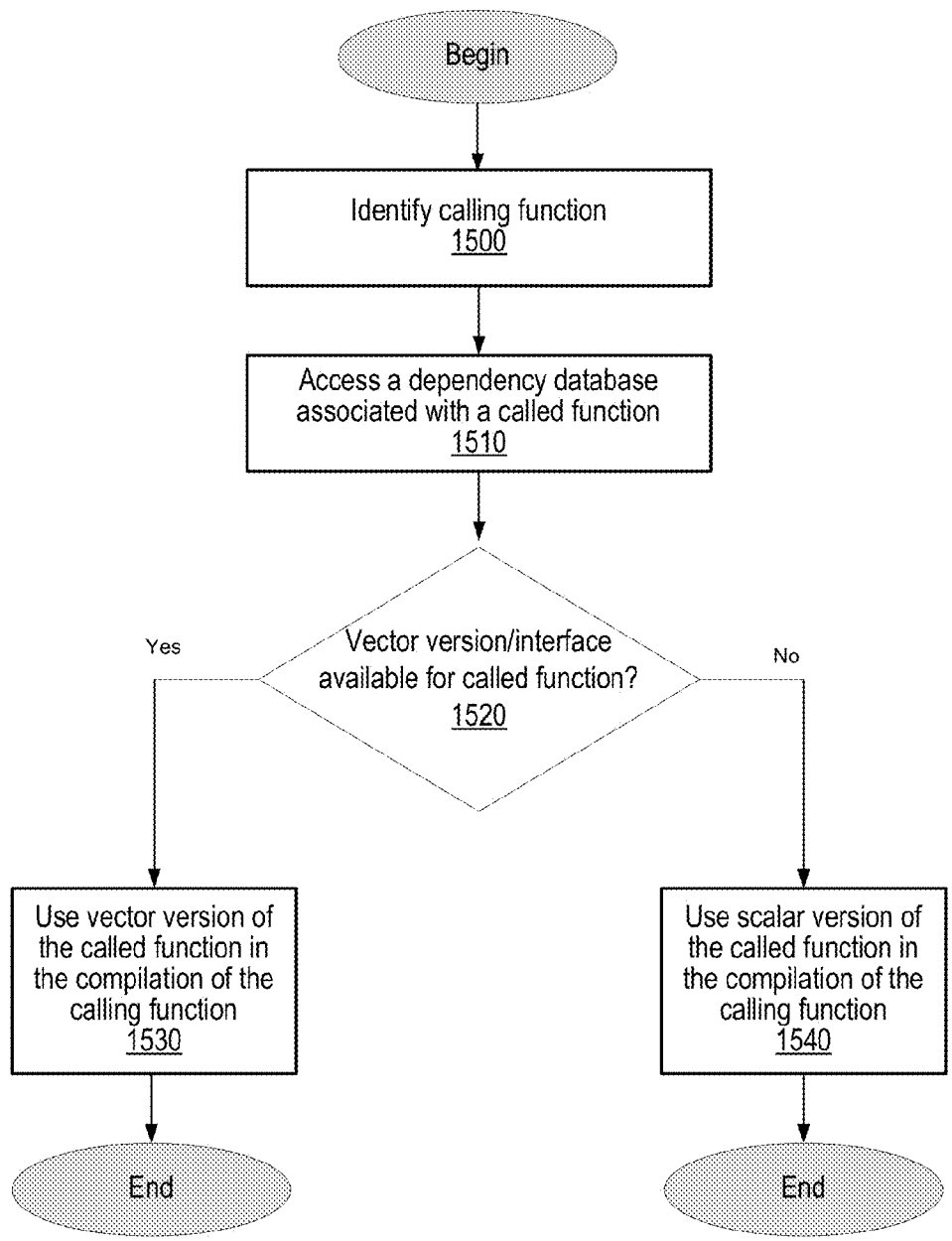
FIG. 15, shows a flow diagram illustrating a method of using a vectorized function according to certain embodiments.

Referring to FIG. 15, a flowchart representing an embodiment of a method of using a vectorized function is depicted. In block 1500, compiler 1100 identifies a calling function that makes a call to called function. For example, the calling function may include a loop that makes the call to a function within a pre-compiled library. In block 1510, compiler 1100 accesses a dependency database associated with the called function. In block 1520, compiler 1100 checks the dependency database to determine whether a vector variant of the called function is available. In one implementation, when the vector version is available, compiler 1100 compiles the calling function to utilize the vector variant of the called function in block 1530. If the vector version is not available, compiler 1100 compiles the calling function to utilize the scalar version (e.g., by iteratively calling the scalar version of the function).

For example, consider again the following loop:

```
for(x=0; x<512; ++x)
{
    C[x]=D[x];
    foo (C);
}
```

When this loop is vectorized, the compiler may check a dependency database associated with foo( ) to determine whether a vector interface associated with foo( ) exists. If foo( )'s vector interface does not exist, then compiler 1100 may only partially vectorize the loop, for example by vectorizing the assignment while leaving the function call in a scalar format.

If, on the other hand, foo( ) has a vectorized interface expressed in its dependency database, then in some instances, compiler 1100 may vectorize the loop in its entirety (e.g., by replacing or otherwise transforming both the assignment and the function call into vector operations).

When the compiler checks foo( )'s dependency database to determine whether a vectorized interface exists for the called function, the compiler may additionally or alternatively examine any memory dependencies associated with the called function that may be expressed the same (or another) dependency database associated with foo( ).

In some implementations, addressing for each dimension of an array may be tracked independently to minimize uncertainty. This concept may apply to all aggregate data types in general, such as structures and arrays. The following example illustrates in greater detail how a compiler, such as compiler 1100, for example, may use dependency database information to enable vectorization, and may employ vector versions of functions in place of scalar versions when possible (it being noted that in other embodiments, a dependency database may be used independently of determining whether vector function interfaces exist, and vice versa).

```
typedef struct
{
int a;
int b;
int c;
int *ptr;
} myStruct;
myStruct g;
int bar (myStruct &p, int j)
{
p.ptr[p.b+j] = 0;
return(p.b > j);
}
void foo(int i)
{
for (int x=i; x<i+200; ++x)
if (bar(g,x));
++g.a;
}
```

In this example, function bar( ) would export dependencies (e.g., via a dependency file generated by compiler 1100 when function bar( ) is compiled, as discussed above) indicating that it writes to p.ptr[ ], and reads from p.b and j:

```
typedef struct
{
int a;
int b;
int c;
int *ptr;
} myStruct;
int bar(myStruct *p, int j)
{
read p.b;
read p.ptr;
write p.ptr[p.b+j];
};
```

It should be noted that, in this particular case, it may be unnecessary to identify references to parameters as "public" or "private." Also, it may be unnecessary to declare that the function reads from p or j, since at least in this example it can be assumed that a function uses its own parameters. The type definition of myStruct can be included in the dependency database to expose it to functions that call foo( ) but may not necessarily be exposed to the definition of myStruct through header file inclusion.

During compilation, compiler 1100 may compile function bar( ) without vectorizing it because there is no loop over which to vectorize. In doing so, it may produce a scalar version of bar( ) having the following interface:

int bar (myStruct*p, int j)

In this example, bar( ) may take a single instance of a pointer to a structure and a single integer as parameters, and return a single integer as a result. Thus, this version of bar( ) is scalar in its inputs and outputs.

However, compiler 1100 may also compile a vector function, with the following interface that can also be exported in the dependency database:

Vector bar(Vector p, Vector j, Vector pred)

In this example, the predicate vector pred designates which vector elements should be processed by this function. For example, assuming that vectors include a defined number of elements, a predicate vector may contain a vector having the same defined number of bits, each bit corresponding to a respective element. Each bit may serve as a Boolean predicate that determines whether its corresponding vector element should be processed (e.g., "yes" if the predicate bit is "1" and "no" if it is "0," or vice versa). Predicates allow the calling function to make conditional function calls and takes care of the tail of the loop if it does not terminate on a vector-length boundary. It is noted that other embodiments may employ different types of predicate formats, such as non-Boolean predicates.

Also, in this example, vector p is a vector of pointers to structures, although in this example they all point to the same instance. Vector j is a vector of simple integers. The compiler can infer this type information from the scalar function declaration.

One possible vector variant of function bar( ) calculates p.b+j for each element of the input vectors, and writes these results into the appropriate array indexes of p.ptr. It also returns a vector of results based on the comparison of p.b and j. In this particular example, the compiler vertically vectorized the function. That is, because bar( ) contains no loop, there are no loop iterations to be transformed into vector elements, as would be the case in horizontal vectorization. Instead, the vectorized version of bar( ) may concurrently operate on different elements of the vector inputs.

During the compilation of foo( ) compiler 1100 may read the dependency information about the function bar( ) which may not necessarily be located in the same source file, and determine that called function bar( ) has no dependencies on g.a, even though the calling function is passing a pointer to the structure g. Because it has this information, compiler 1100 can horizontally vectorize the loop in function foo( ). Furthermore, compiler 1100 can make a single function call to the vector variant of bar( ) for each vector processed, rather than calling the scalar variant in every iteration of the loop. Finally, compiler 1100 may create a vector variant of foo( ) with a vector interface. In this particular case vertical vectorization may not be applied since the full extent of x cannot be analyzed for dependencies. Horizontal vectorization of the loop may be applied, and it is contained within another loop that iterates over the vector elements that were passed to the vector variant of function foo( ).

Under these assumptions, function foo( ) might export the following dependencies:

```
void foo(int j)
{
readwrite public g.a;
readpublic g.b;
readpublic g.ptr;
writepublic g.ptr[@];
};
```

(The @ symbol represents unknown addressing.) Because function bar( ) exported the dependency "write p.ptr[p.b+j]," compiler 1100 could tell that structure member ptr[ ] is written to as a function of x. Thus, compiler 1100 may report to callers of foo( ) that the index that is written to is unknown, since it cannot be determined by callers of foo( ).

Additional Implementation Techniques

This section describes additional non-limiting compiler techniques that may be used to implement non-leaf and full-function vectorization. The description below is based on Macroscalar compiler technology, but a person of ordinary skill in the art will recognize in light of this disclosure that other compiler technologies may be used.

The previous example illustrated that addressing can include mathematical expressions. This is generally true as long as the expression does not involve a function call, and contains only terms that are visible to the calling function. This can include indirect addressing, such as when look-up tables are used in the calculation of indexes into other arrays.

Indirect addressing is one situation where configuring the compiler and linker to export static arrays as public can help vectorize more loops. Consider the following example:

```
int foo(int i)
{
static int A[100] = {. . .};
return(B[A[i]]);
}
void bar(void)
{
for (x=0; x<100; ++x)
{
t = B[x];
B[t] = foo(x);
}
}
```

The dependencies generated for foo( ) may differ depending on whether the compiler and linker are configured to export static symbols publicly. In the examples that follow, the first dependency file expresses private static variables and the second dependency file expresses public static variables:

```
int foo(int i)
{
read private A[i];
read public B[@];
};
int foo(int i)
{
static int A[100];
read public A[i];
read public B[A[x]];
};
```

Note that the type declaration of A may be necessary in the dependency file when it is exported publicly. When static variables are private, the addressing of B[ ] is unknown, since it cannot be determined from outside the function. Since hazard checking is not possible the vectorization of the loop in bar( ) may not be performed. When the tools are configured to export static variables publicly, however, the compiler can emit instructions that read the contents of A[x], and check for hazards between B[A[x]] and B[x], thus enabling vectorization of the loop.

Naturally, when static variables are publicly exported and addressed externally, the opportunity for name conflicts arise. To help avoid such conflicts, static variables can be name-mangled with the function and file in which they are declared.

Some hazards involve memory operations that occur conditionally, or involve addressing that may differ based upon conditional calculations. To support the vectorization of loops that call functions involving conditional dependencies, a mechanism may be provided to express how the condition affects the dependencies.

For example, consider the following code:
if (A[x]<c)d=B[x];
This code may be expressed in a dependency database as:

```
read public A[x];
read public c;
A[x] < c ? read public B[x];
A[x] < c ? write public d;
```

Conditional expressions may also exist in the calculation of the address. For example, consider the following code:

```
if (A[x] < c)
d = B[x];
else
e = B[x+c];
```

This code may be expressed in a dependency database as:

```
read public A[x];
read public c;
A[x] < c ? write public d : write public e;
A[x] < c ? read public B[x] : read public B[x+c];
```

Alternatively, the latter conditional expression above may be expressed as:
read public B[A[x]<c?x:x+c];
In some cases, unknowns may creep into the dependency expression. In this case, one illustrative example may be:

A[x]<c?read public B[x]:read public B[@];

This expression may inform the compiler about a specific dependency on B if the condition is true and an unknown dependency on B when the condition is false.

Unknowns that creep into the conditional expression may cause unconditional dependencies that behave as if the condition is both true and false. For example:

A[x]<B[@]?read public f:read public g;

May be expressed as:

read public f;
read public g;

And:
read public A[x>@?x:x+y];
May be expressed as:

read public A[x];
read public A[x+y];

Because calling functions are typically unable to evaluate unknown conditions, they may make the conservative assumption that both possible indexes into A[ ] are accessed.

In some implementations, circular dependencies may also be expressed in a dependency database. For example, consider the function below:

if (A [x]>b)b=A[x]

In one implementation, this function may be expressed as:

read public A[x];
read public b;
A[x] > b ? write public b;

Where pointers or references are passed to a function (also referred to as "passing by reference"), it is possible for the function to modify its calling parameters. This differs from modifications of parameters passed by value, for example, because modifications of parameters passed by reference may affect the operation of the calling function. Modifications of parameters passed by reference may be recorded in the same manner that modifications of static and global storage are recorded. Modifications of parameters passed by value may be treated as modifications of local automatic storage. In some instances, they may not be recorded because they are invisible to the calling function.

In some implementations, functions that meet a set of criteria may be called speculatively in cases where software speculation would be necessary to vectorize the calling loop. Accordingly, speculation-safe indicators may be expressed in the dependency file and may serve as indications that the corresponding code may be safely called in a speculative manner. In one non-limiting example, vector functions that are capable of being called speculatively may fall into one of two categories: type-A and type-B. Type-A functions may be vector-functions having the normal vector interface described herein. For instance, type-A functions may be called speculatively with no harmful side effects if they meet the following criteria. First, the function accesses no memory other than local automatic non-array storage. Second, the function does not call any other functions that are not also type-A functions. Examples of type-A functions might be transcendentals or other iterative convergence algorithms.

In addition to any return values specified by the source code, type-B functions may return a predicate vector that indicates which elements were processed. In an embodiment, the criteria for speculatively calling type-B functions may be as follows. First, any reads from non-local storage or local array storage use first-faulting read instructions. Second, the function does not write to non-local storage or static local storage. Third, the function does not call any functions that are not also type-A or type-B functions.

Calling a type-A function from a loop may be similar to calling a non-speculative function. Typically, no special action is necessary on the part of the calling loop when speculatively calling a type-A function. Calling a type-B function, however, may require the calling loop to check the return vector in order to determine which elements were processed, and adjust the behavior of the calling loop in response.

A compiler such as compiler 1100 may choose to have all callers of type-B vector functions adjust their behavior to accommodate the number of elements that were actually processed, regardless of whether software speculation is used in the calling loop. Alternatively, compiler 1100 may create two vector-functions for each type-B function; one speculative and one non-speculative. The criterion for type-B loops can be generally designed to ensure that those loops that qualify are few and small, and thus the code-size impact for this approach may be negligible.

Type-A and type-B vector functions may be identified by their declaration in the dependency database, as shown below. In one implementation, the absence of a designator implies the function may not be called speculatively.

int func1(int a) : A
{
read public b; // local-static
write public c; // local-static
};
int func2(int a) : B
{
read public d; // non-local
};

Aliasing can sometimes be a problem for vectorizing compilers. While Macroscalar architecture addresses the problem through run-time alias analysis, there is an overhead to this approach. Overhead in Macroscalar programs contributes to the serial component in Amdahl's law, which can limit the benefits of wider vectors. Moreover, aliasing with external or static variables can affect behavior across function calls. Therefore, in one implementation, compile-time alias analysis is performed and an aliasing indicator is exported to a dependency file.

For instance, one approach may be to separate aliasing events into two categories such as, for example, inbound and outbound aliasing. From the perspective of the called function, inbound aliasing may refer to addresses that come into a function, such as those passed-in as parameters, read from external variables, or calculated by the function by taking the address of an external variable. Meanwhile, outbound aliasing may refer to pointers that the function puts out. These can be return values—i.e., values that the function writes into external variables or de-referenced pointers.

Further, at least two types of aliasing can be tracked. "Copies aliasing" may indicate that the pointer may be a copy of another pointer and might alias anything the pointer can alias. "Points aliasing" may indicate that a pointer is likely to affect another variable. Alias information in the dependency file is an affirmative expression of the possible existence of an alias. It need not be used, for example, when the compiler simply cannot tell whether two pointers reference the same memory due to lack of information.

The declaration of aliasing for variables may be similar to the declaration of aliasing for return values. For example, consider the function below:

```
static int s;
static void *ptr, *ptr2;
static void *A[1000];
void foo(int x, int y)
{
A[x] = (void*) s;
A[y] = (void*) &s;
ptr1 = &A[s];
ptr2 = A[s];
}
```

In one implementation, this function may express the following dependencies:

```
void foo(int x, int y)
{
read public s;
write public A[x] copies s;
write public A[y] points s;
write public ptr1 points A[s];
read public A[s];
write public ptr2 copies A[s];
};
```

The foregoing distinguishes between points and copies for clarity, although it may be possible to combine these two concepts in an alternate syntax. As with other dependency information, aliasing information typically propagates upward through the chain of calling functions.

The values returned by a function may also result in aliasing, for example, through the return value itself, or through information returned by modifying passed-by-reference variables. These can also be tracked in the dependency file. For example, consider the function below:

```
static float gVar;
int *foo(float *ptr1, float **ptr2)
{
*ptr2 = &gVar;
return((int*)ptr1);
}
```

In one implementation, this function may export the following dependencies:

```
int *foo(float *ptr1, float **ptr2)
{
write *ptr2 points gVar;
return copies ptr1;
};
```

The dependency declaration may inform the calling loop that the pointer returned by foo( ) might be a copy of the pointer that was passed in. This allows the calling loop to take measures to ensure correct operation of the loop regardless of the aliasing that occurs. Furthermore, this knowledge can also enable the compiler to better leverage ANSI aliasing rules when faced with code that is no ANSI-C compliant.

As another consideration, the casting of pointers may affect address calculations. For example, consider the function below:

```
void ZeroInt(char *ptr, int x)
{
*((int*)ptr + x) = 0;
return;
}
```

In one implementation, this function may export the following dependencies:

```
void ZeroInt(char *ptr, int x)
{
write *((int*)ptr+x);
}
```

Calls via function pointers may not ordinarily be vectorized due to the fact that it is unknown at compile-time what function will be called or whether the called function supports a vector interface. Functions that call other functions via pointers may not export dependency information, which can be a reflection on the uncertainty of the dependencies on the pointed-to function. This may cause the compiler to view such functions as scalar functions with unknown dependencies.

In one implementation, a versioning scheme allows dependencies to be expressed using best practices at any point in time. For example, an embodiment may permit backward compatibility with dependency-files generated by older compilers, whereas another embodiment may permit bi-directional compatibility that enables older compilers to also read files generated by newer compilers. In cases where backward compatibility is the only requirement, then a version designator for the dependency file is used to inform older compilers that a given file is unreadable and should be ignored.

Bi-directional compatibility may be implemented as follows. Assume, for example, that compiler version 1 does not support calculations in array indices but complier version 2 does. A write to B[x+y], may be expressed by a version-1 compiler as:

```
#1 int foo(int x, int y)
{
write public B[@];
};
```

On the other hand, a version-2 compiler may additionally export the same function using a version-2 syntax:

```
#2 int foo(int x, int y)
{
write public B[x+y];
};
```

With this approach, not only can a version-2 compiler read version-1 files, but it can also allow version-2 declarations to override version-1 declarations. A version-1 compiler would know to ignore any declarations that were greater than version-1, giving it as much dependency information as it is capable of understanding. This is a significant capability as compiler technology matures.

Generally speaking, if developers are required to make changes to software to enable vectorization, then relatively little code may become vectorized. To address this problem, the techniques described herein provide the ability to perform large-scale vectorization without requiring developers to modify their source code.

Auto-Threading

As described above, it may be possible to exploit parallelism at runtime dependent upon dynamic conditions by switching between non-parallel (scalar) and parallel (vector) execution for loop iterations. Such methods are only one of numerous ways parallelism within program code may be exploited. For example, program code used on computer systems that allow simultaneous processing of multiple tasks may be compiled to take advantage of parallelism within the code. Various embodiments of methods for generating multithreaded code will now be disclosed.

Computer systems, such as computer system 100 of FIG. 1, interact with application software through the portion of the operating system commonly referred to as the "kernel." The primary task of the kernel is to manage the system resources such as, e.g., the CPU, the memory, and input/output (I/O) devices, and determine when applications are granted access to the hardware resources.

Figure 16:
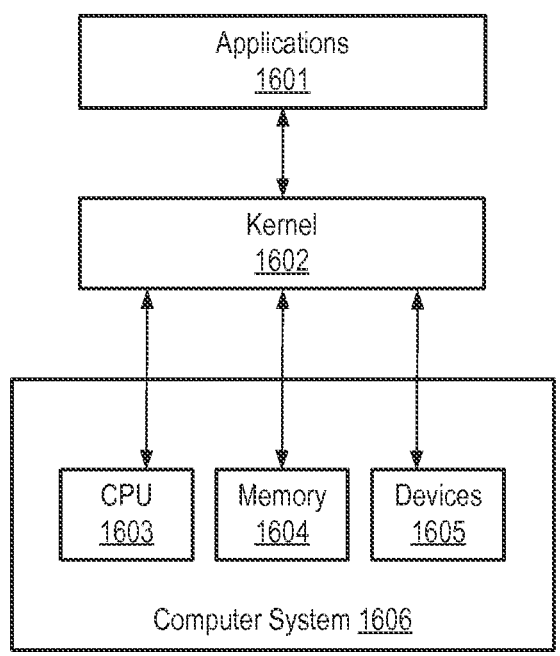
FIG. 16 shows a block diagram depicting the interaction between computer system hardware and application software.

Turning to FIG. 16, a block diagram depicting the interaction between the computer system hardware and application software is illustrated. Application software 1601 communicates with kernel 160 which, in turn, communicates with computer system 1606. It is noted that computer system 1606 may contain some or all of the features of computer system 100.

Figure 17:
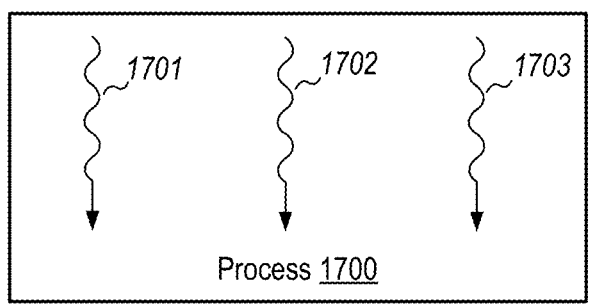
FIG. 17 shows a diagram illustrating a process with multiple threads.

When an application from application software 1601 requires access to CPU 1603, memory 1604, or one of devices 1605, the application may make a request through kernel 1602 for access to the required hardware. In the case of a request for access CPU 1603, kernel 1602 may spawn a process on CPU 1603 to execute the compiled code from the requested application. In some embodiments, kernel 1602 may schedule the process as a single task or "thread." In other embodiments, kernel 1602 may attempt to take advantage of parallelism in the compiled code of the application and schedule multiple threads for the process. Although kernel 1602 is described as threading application software, it is noted that any software may be threaded. For example, in various embodiments, device drivers, utilities, other operating system software components, and the like may be threaded. FIG. 17 illustrates a process 1700 that contains three threads, 1701, 1702, and 1703. It is noted that the number of threads may depend on the amount of parallelism in the code being executed as well as the kernel's ability to schedule multiple threads for execution on the hardware.

Figure 18:
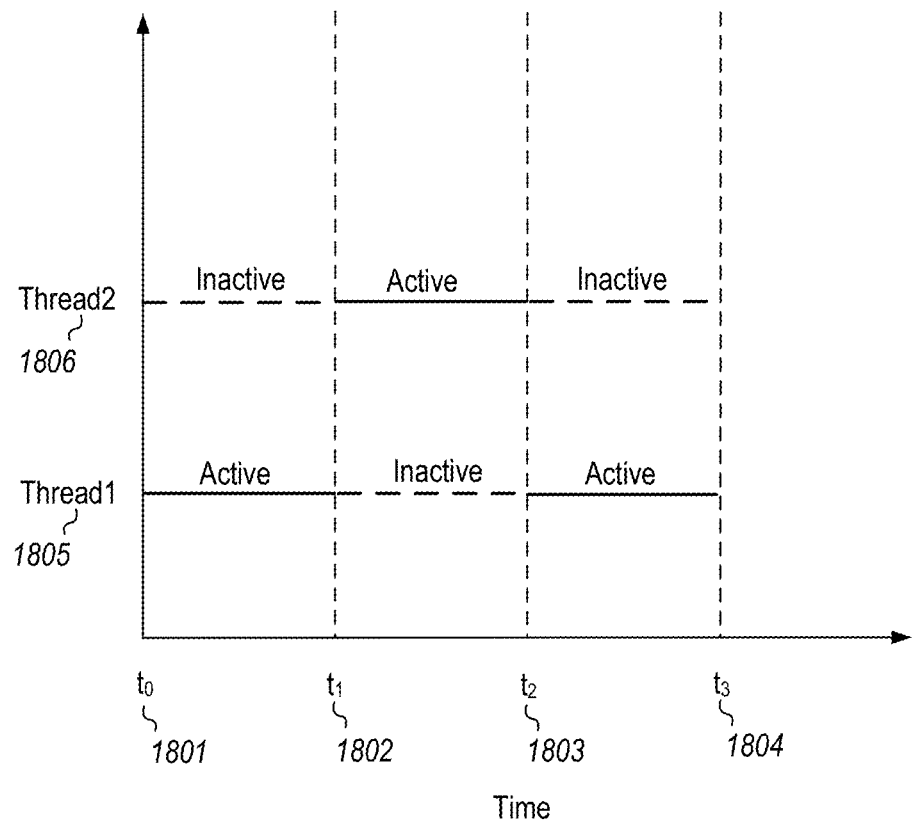
FIG. 18 shows a diagram depicting a possible method for scheduling multiple threads.

In the case where kernel 1602 is able to schedule multiple threads for a given process, the threads may be scheduled by various methods dependent upon the hardware available in CPU 1603. In one embodiment, kernel 1602 will schedule a first thread to execute for a period or time and then schedule a second thread to execute for a period of time. FIG. 18 illustrates a possible method for scheduling two threads where there are insufficient hardware resources to allow the threads to be concurrently executed. In such cases, each thread is allotted access to the hardware resources for a given amount of time and may preclude performance improvements resulting from simultaneous execution of threads as described below in more detail. At time 1801, kernel 1602 starts the execution of thread1 1805, which continues to execute until time 1802. At time 1802, kernel 1602 and CPU 1603 stop the execution of thread1 1805 and begin execution of thread2 1806. When CPU 1603 switches from thread1 1805 to thread2 1806, it may be necessary to re-load registers within CPU 1603 with data necessary for the execution of thread2 1806. The process of switching CPU 1603 to execute different threads is commonly referred to as "context switching." Another context switch is performed at time 1803 when kernel 1602 and CPU 1603 stop execution of thread2 1806 and resume execution of thread 1805, which continues until time 1804.

Figure 19:
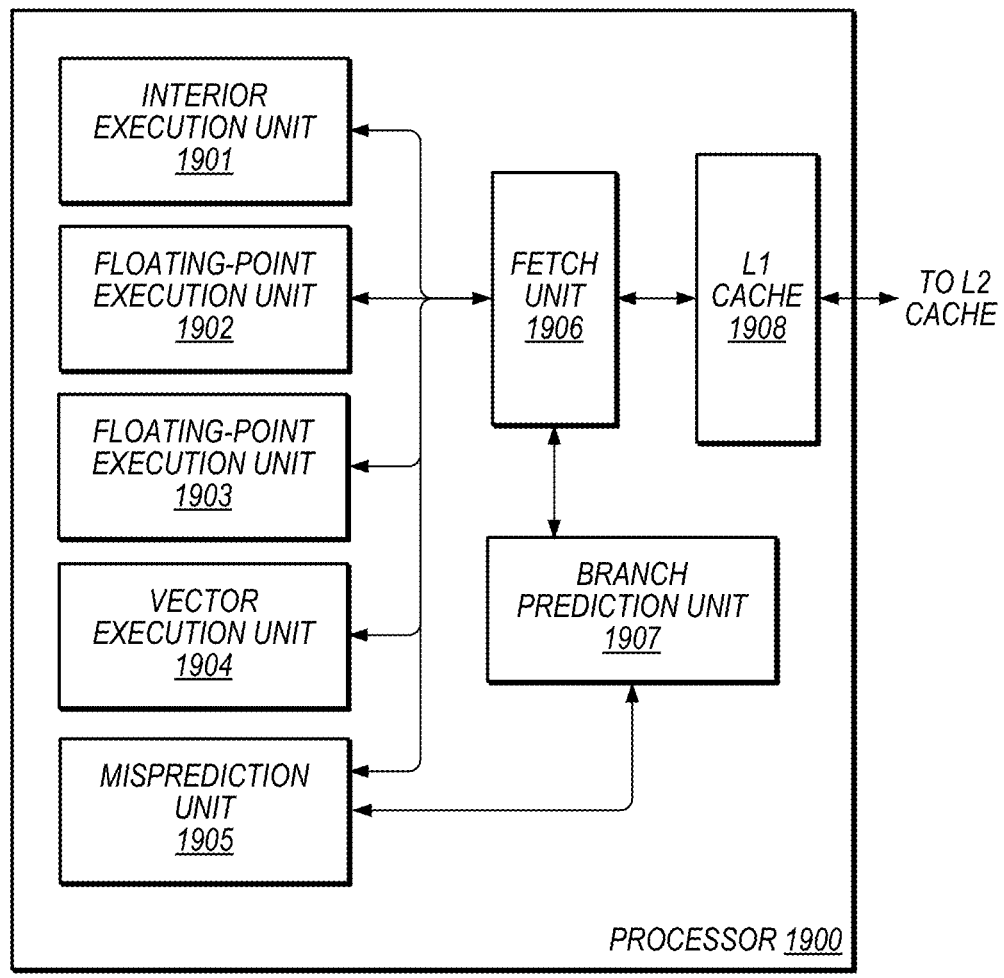
FIG. 19 shows a block diagram of an embodiment of a superscalar processor.

Turning to FIG. 19, an embodiment of a superscalar processor is illustrated. Processor 1900 includes and interior execution unit 1901, a first floating-point execution unit 1902, a second floating-point execution unit 1903, a vector execution unit 1904, a misprediction unit 1905, a fetch unit 1906, a branch prediction unit 1907, and a level-1 (L1) cache 1908. It is noted that in other embodiments, additional units, such as, e.g., a second vector execution unit may be included in processor 1900. In some embodiments, processor 1900 may be general-purpose or embedded processors implementing any suitable instruction set architectures (ISAs), such as, for example, the x86, PowerPC™, ARM™, SPARC™, or MIPS™ ISAs.

In some embodiments, it is possible for the kernel to take advantage of the first and second floating-point units, 1902 and 1903, respectively, by scheduling threads into each of the units. For example, if compiled code requires two simultaneous floating point operations that are independent of each other, the kernel may schedule a first thread into the first floating point unit 1902 to perform the first operation, and schedule a second thread into the second floating point unit 1903 to perform the second operation. This type of thread management is commonly referred to as "simultaneous multithreading." In other embodiments, the additional function units of a superscalar processor may be used to provide redundant computation that may be used for error detection and recovery.

The kernel may also be able to take advantage of a wide datapath in one of floating-point units 1902 and 1903, or vector unit 1904, by scheduling threads to execution on different portions of the wide datapath. For example, two threads, each requiring 32-bit operations, may be scheduled to run concurrently on separate portions of a single 64-bit datapath. In such cases, an unused portion of a datapath may be employed to run another thread, thereby improving system performance. For example, a 64-bit adder may be capable of separately and concurrently executing two 32-bit addition operations that correspond to different threads. This type of thread management may also be referred to as "hyperthreading."

Figure 20:
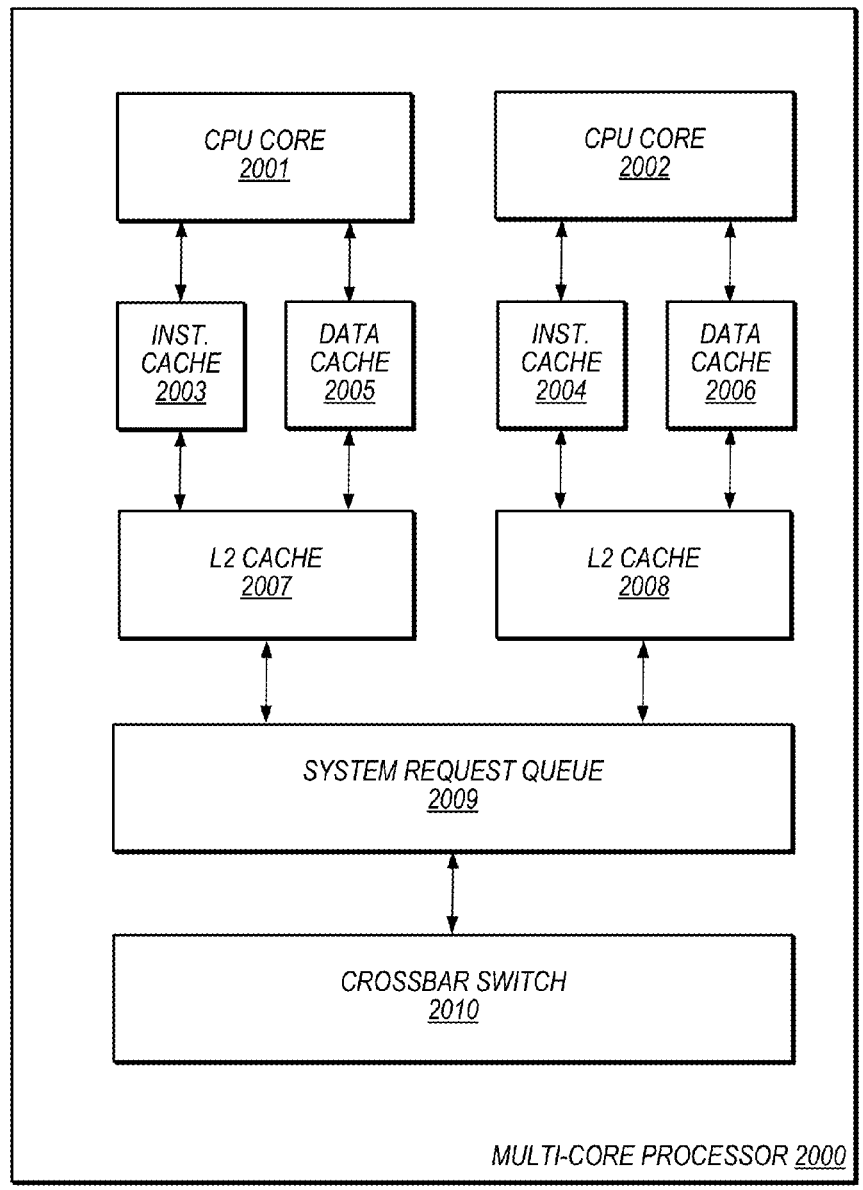
FIG. 20 shows a block diagram of a multi-core processor.

In some embodiments of computer system 100, processor 102 may be a multi-core processor. FIG. 20 illustrates a multi-core processor that may, in some embodiments, correspond to processor 102. Multi-core processor 2000 contains CPU cores 2001 and 2002, instruction caches 2003 and 2004, data caches 2005 and 2006, L2 caches 2007 and 2008, system request queue 2009, and crossbar switch 2010. In some embodiments, CPU cores 2001 and 2002 may be general-purpose or embedded processors implementing any suitable instruction set architectures (ISAs), such as, for example, the x86, PowerPC™, SPARC™, or MIPS™ ISAs.

In multi-core processor 2000, CPU core 2001 is coupled to instruction cache 2003 and data cache 2005, and CPU core 2002 is coupled to instruction cache 2004 and data cache 2006. Instruction cache 2004 and data cache 2005 are coupled to L2 cache 2007, and instruction cache 2004 and data cache 2006 are coupled to L2 cache 2008. L2 cache 2007 and L2 cache 2008 are coupled to system request queue 2009, which is coupled to crossbar switch 2010. It is noted that in different embodiments, other functional blocks and alternative configurations are possible and contemplated.

During operation, kernel 1602 may spawn threads or processes on each of CPU cores 2001 and 2002. Since each of CPU cores 2001 and 2002 are coupled to their own instruction, data, and L2 caches, a thread or process assigned to CPU core 2001 may execute independently of a thread or process assigned to CPU core 2002. The method of executing threads or processes on individual CPU cores within a multi-core processor may also be referred to as "symmetric multiprocessing."

As described above, there are numerous methods for managing threads within a computer system. Each type of thread management may allow certain performance advantages to a computer system, dependent upon hardware resources, software being executed, and the like. In various embodiments, however, one or more of the aforementioned thread management methods may be combined to allow for more concurrent operations to be performed. Hyperthreading, simultaneous multithreading, and symmetric multiprocessing may be combined within a single computer system to allow for a high degree of concurrent operations. For example, through the use of hyperthreading, simultaneous multithreading, and symmetric multiprocessing, two 64-bit cores may execute four concurrent 32-bit threads, with two threads executing on each core.

In the embodiments described above, the ability of kernel 1602 to spawn multiple threads in a time domain multiplexing fashion, a simultaneous multithreading fashion, or a symmetric multiprocessing fashion, is dependent upon the application source code being compiled to exploit parallelism inherent in the source code. As previously described, compiler 1100 may generate vectorized object code. In some embodiments, with the necessary hardware support for Macroscalar instructions, compiler 1100 may generate code that allows kernel 1602 to spawn multiple threads and processes (commonly referred to as "multithreaded code") in one of the previously described manners. The method of a compiler generating multithreaded code may also be referred to as "autothreading."

Figure 21:
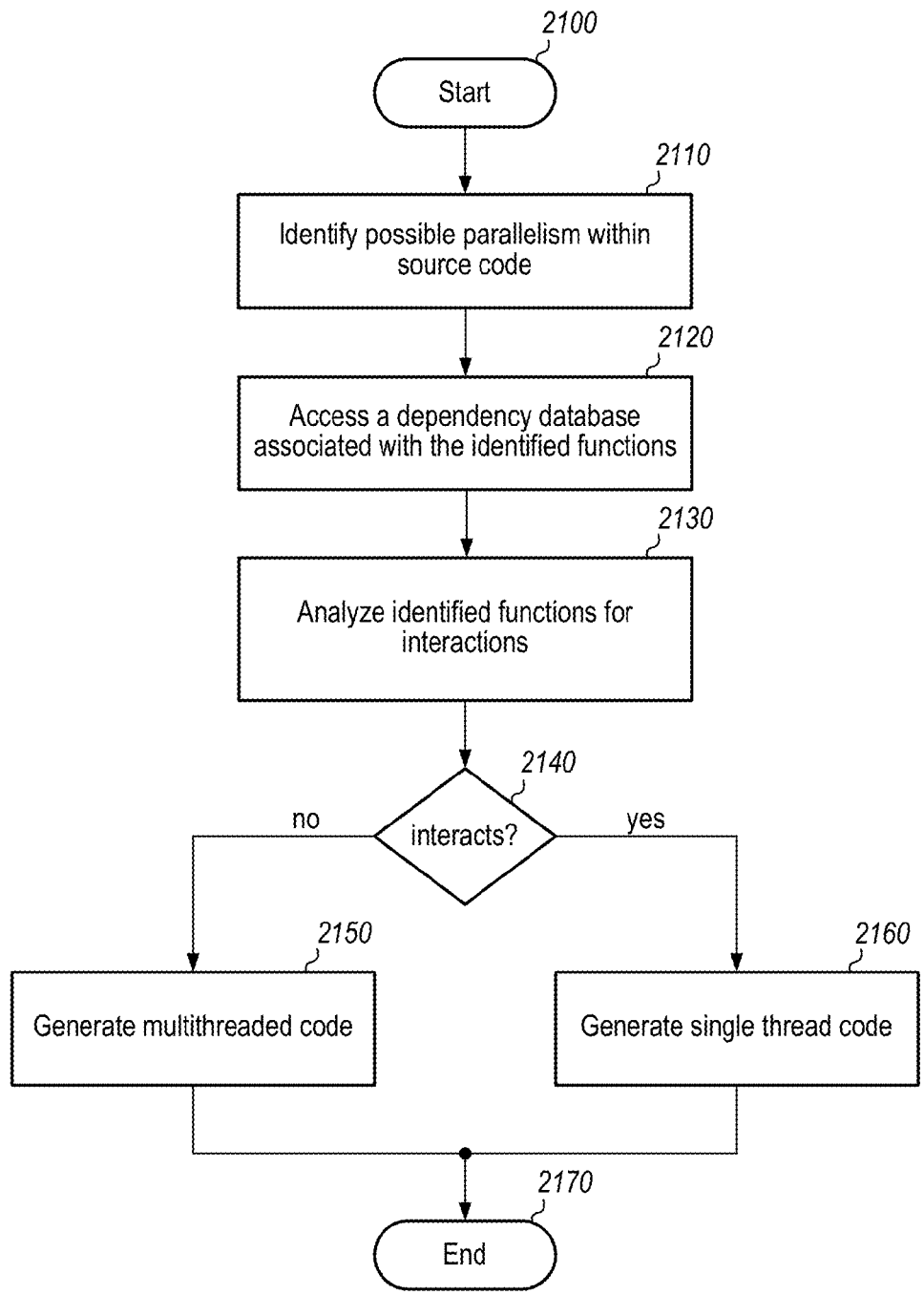
FIG. 21 shows a flow diagram illustrating a method of generating multithreaded code according to certain embodiments.

Turning to FIG. 21, a possible method of operation of compiler 1100 to generate multithreaded code is illustrated. The operation begins in block 2100. The operation continues with compiler 1100 identifying a portion of source code that may be converted to multithreaded code (block 2110). Such portions of source code may include, for example, nested function calls and function calls within loops. Compiler 1100 then accesses a dependency database associated with the functions in the identified portion of the source code (block 2120). The functions within the identified portion of source code are then analyzed for possible interactions based, in part, on the information obtained from the dependency database (block 2130). Possible interactions between the functions may include data overlap, i.e., when a function attempts to read a variable that another function is writing. The operation is then dependent upon the result of the analysis (block 2140).

When the analysis determines that there is no interaction between the functions within the identified portion of source code, multithreaded code is generated (block 2150) and the operation completes (block 2170). When the analysis determines that interactions between the functions within the identified portion of source code are possible, single threaded code is generated (block 2160) and the operation completes (block 2170). It is noted, however, that in the embodiment of the method illustrated in FIG. 21, run time dependencies may still be present in the multithreaded code, thereby limiting the concurrency of such code. As will be described below in more detail, other steps may be performed during compilation to identify and analyze run time dependencies with the source code.

Figure 22:
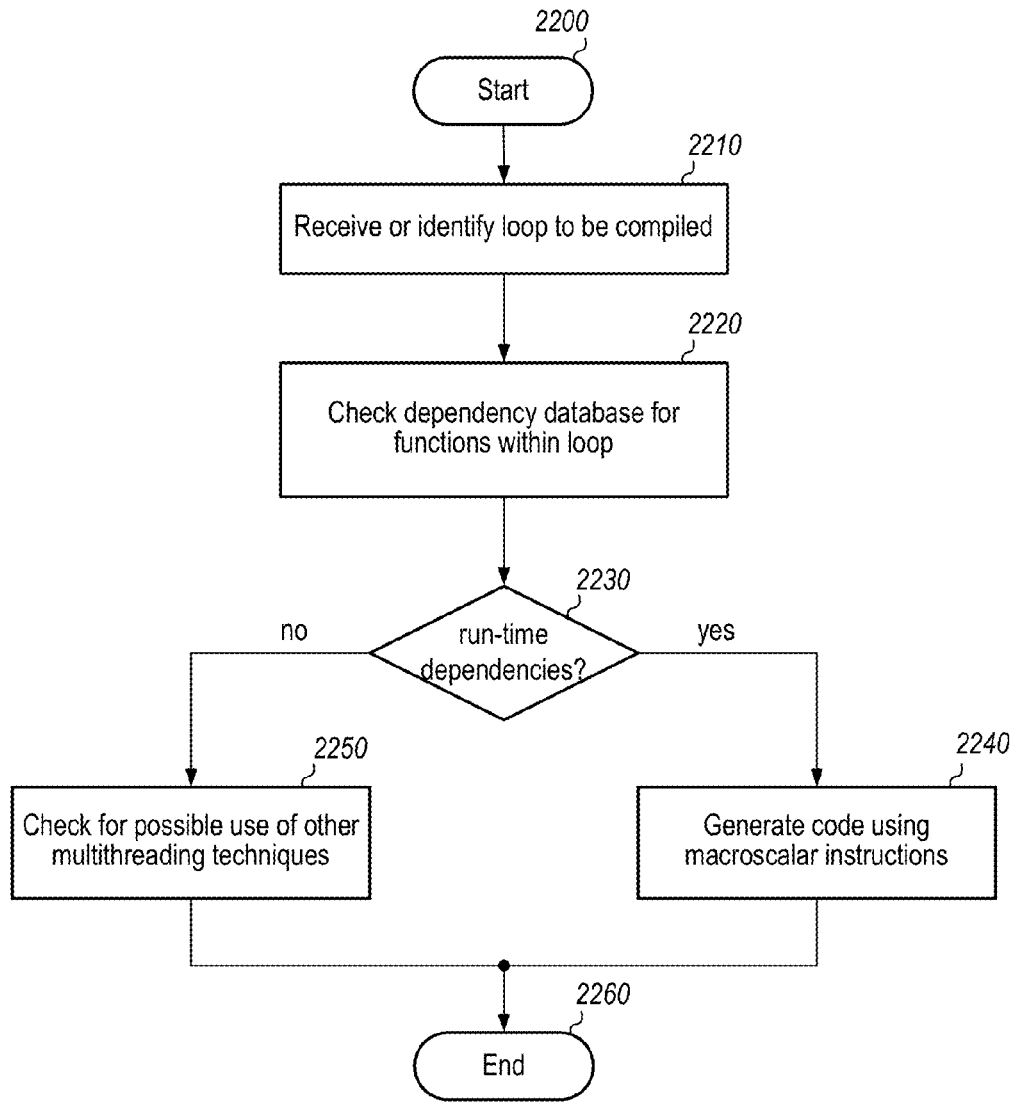
FIG. 22 shows a flow diagram illustrating another method of generating multithreaded code according to certain embodiments.

FIG. 22 illustrates another possible method of operation of compiler 1100 to generate multithreaded code dependent upon possible run time dependencies. The operation begins in block 2200. Compiler 1100 then receives or identifies a source code loop to be compiled (block 2210). It is noted that the source code may be written in a high-level programming language such as C, C++ or any other suitable programming language. A dependency database is then checked for any functions within the source code loop (block 2220). The operation then depends on possible run time dependencies within the source code loop (block 2230).

When there are no run time dependencies, compiler 1100 checks for the possible use of other multithreading techniques (block 2250). Dependent upon hardware resources available within a computing system, compiler 1100 may be able to generate multithreaded code suitable for use with hyperthreading, simultaneous multithreading, and symmetric multiprocessing. In various embodiments, compiler 1100 may perform steps similar to those performed in the embodiment of the method illustrated in FIG. 21 to determine interactions between function calls. If interactions are identified, compiler 1100 may generate single threaded code, while if no interactions are identified, compiler 1100 may generate multithreaded code. With the completion of any code generation in block 2150, the operation then concludes in block 2260.

When there are possible run time dependencies, compiler 1100 generates multithreaded code with the appropriate Macroscalar instructions such as, e.g., CheckHazardP, such that the kernel 1602 may spawn multiple threads. The operation then concludes in block 2260. It is noted that, any suitable combination of thread management, and appropriately generated compiled code, may be employed to increase concurrency of operations within a computer system. In some embodiments, any parallelism in source code may be exploited using multithreaded code that includes Macroscalar instructions, while, in other embodiments, multithreaded code with and without Macroscalar instructions may be employed.

Source code may contain numerous loop structures, only some of which may be suitable for compilation into multithreaded code. The examples that follow illustrate possible loop structures that compiler 1100 may be able to compile into multithreaded code.

Independent Loop Iterations with Function Call

When source code is compiled, the compiler will examine the code for possible portions of the source code that can be compiled into multi-threaded code. For example, consider the following loop.

```
for (x=0; x<n; ++x)
{
  foo(x);
}
bar( );
```

When the loop is to be compiled, the compiler may check the persistent dependency database to determine dependencies between the functions foo( ) and bar( ). In the case where no dependencies exist between the two functions, and the function foo( ) only has dependencies on other invocations of the function foo( ) with the same argument, the compiler is able to generate multi-threaded code that will allow multiple invocations of the function foo( ) to be issued into separate threads that may be executed in parallel.

In the case where the function bar( ) depends on data written by the function foo( ), the compiler may generate code which ensures that the function bar( ) will not execute until the all invocations of the function foo( ) have been completed. On the other hand, if, based on a check of the persistent dependency database, the compiler determines that the function bar( ) is independent of any data modified by the function foo( ), then the compiler may generate multi-threaded code that will allow the function bar( ) to be issued into a separate thread from the thread containing the invocations of the function foo( ). This allows the function bar( ) to execute in parallel to the various invocations of the function foo( ).

Loops with Conditionally Dependent Function Calls

When there are data dependencies across invocations of a function within a loop, the compiler is not able to determine which iterations of the loop contain the dependencies. Consider the following example.

```
for (x=0; x<n; ++x)
{
  foo(A[x]);
}
```

In this case, the compiler assembles a vector of A[x] and includes the Macroscalar CheckHazardP instruction in the generated code. With the inclusion of the CheckHazardP instruction, the multi-threaded code generated by the compiler may spawn different threads for each invocation of the function foo( ) that uses unique values of A[x] (which is determined at run time by the CheckHazardP instruction). The generated multi-threaded code may also wait between invocations of foo( ) when it is determined that unique values of A[x] are not being used.

Loops with Interdependent Function Calls

In the following example, the compiler checks the persistent dependency database and determines that the function bar( ) writes to storage that is also used by foo( ).

```
for (x=0; x<n; ++x)
{
  if(A[x] < K)
    foo(x);
  else
    bar(x);
}
```

The compiler is able to determine that invocations of the function foo( ) are independent of each other, but are dependent upon invocations of the function bar( ). The compiler may generate code that uses the Macroscalar ConditionalStop instruction to detect transitions in the direction of the if-else branch at run time so that multiple threads of foo( ) may be issued for iterations of the loop when the if-else evaluates true. When the if-else evaluates false, the generated code may wait before issuing the bar( ) function until prior foo( ) threads complete.

Heterogeneous Functions in a Loop

In the following example, the functions foo( ) and bar( ) are determined to be independent of each other following a check of the presistent dependency database. The compiler is then able to generate code that spawns a thread for invocations of foo( ), each invocation to execute serially, and a separate thread for invocation of bar( ), each invocation to execute serially.

```
for (x=0; x<n; ++x)
{
  foo(x);
  bar(x);
}
```

In some cases, however, the functions foo( ) and bar( ) may interact with each other through an argument passed to the functions, as shown in the following example. After a check of the persistent dependency database, it is determined that the functions foo( ) and bar( ) may interact through vectors A[x] and B[x]. The compiler will then generate code utilizing the Macroscalar CheckHazardP instruction to detect overlap between the vectors A[x] and B[x]. When executed, the generated code may spawn multiple threads, each serially executing the functions foo( ) and bar( ), when no overlap between the vectors A[x] and B[x] exist. The code may wait for previously spawned threads to complete execution before spawning new threads when an overlap was detected.

```
for (x=0; x<n; ++x)
{
  foo(A[x]);
  bar(B[x]);
}
```

Heterogeneous Functions Outside a Loop

In some embodiments, it may be possible for the compiler to generate multithreaded code. In the following example, the functions foo( ) and bar( ) depend only on previous invocations of the functions, respectively (as determined by checking the persistent dependency database). Using this information, the compiler may be able to generate code that will spawn foo( ) and bar( ) into separate threads.

```
void func(int x)
{
  foo(x);
  bar(x);
}
```

In other embodiments, the compiler may be able to create a vector version of func( ). The compiler may then generate multithreaded that includes the Macroscalar CheckHazardP instruction to detect run-time occurrences of when the arguments to foo( ) and bar( ) overlap. In cases where the arguments do not overlap, the multithreaded code will allow the functions foo( ) and bar( ) to be spawned into separate threads that execute in parallel.

Although the embodiments above have been described in considerable detail, numerous variations and modifications will become apparent to those skilled in the art one the above disclosure is fully appreciated. It is intended that the following claims be interpreted to embrace all such variations and modifications.

What is claimed is:

1. A system, comprising:
one or more memories that, during operation, store instructions; and
one or more processors that, during operation, retrieve instructions for the one or more memories and execute the instructions to cause the system to perform operations comprising:
identifying, within source code of a called function, a dependency of the called function on a variable that is not defined by the called function's programming interface as a parameter of the called function;
generating a persistent dependency database associated with the called function, wherein the persistent dependency database stores an indication of the dependency, and wherein the indication is stored in the persistent dependency database prior to beginning compilation of source code including a calling function that calls the called function;
identifying a call to the called function within source code of the calling function, the identifying occurring subsequent to beginning compilation of the source code including the calling function;
in response to identifying the call, accessing the persistent dependency database; and
compiling the calling function to utilize a parallel implementation of the called function responsive to detecting the indication of dependency stored in the persistent dependency database.

2. The system of claim 1, wherein the operations further comprise:
compiling a scalar version of the called function; and
compiling a vector version of the called function.

3. The system of claim 2, wherein compiling the calling function to utilize the parallel implementation of the called function comprises compiling the calling function to utilize the vector version of the called function responsive to detecting the indication of dependency stored in the persistent dependency database.

4. The system of claim 1, wherein compiling the calling function to utilize the parallel implementation of the called function comprises generating multithreaded code corresponding to the calling function responsive to detecting the indication of the dependency stored in the persistent dependency database.

5. The system of claim 1, wherein the indication of dependency indicates that the called function only reads a data item, only writes the data item, or both reads and writes the data item.

6. The system of claim 1, wherein the indication of dependency indicates that the called function writes a data item that is read by the calling function.

7. A non-transitory computer-readable storage medium having program instructions stored therein that, in response to execution by a computer system, cause the computer system to perform operations including:
identifying, within source code of a called function, a possible run-time data dependency of the called function on a variable that is not defined by the called function's programming interface as a parameter of the called function, wherein identifying the possible run-time data dependency occurs prior to beginning compilation of source code including a calling function that calls the called function;
identifying a call to the called function within source code of the calling function, the identifying occurring subsequent to beginning compilation of the source code including the calling function;
generating a determination of whether the calling function interacts with the called function based at least, in part, upon the possible run-time data dependency; and
compiling the calling function to utilize a parallel implementation of the called function dependent at least, in part, on the generated determination.

8. The non-transitory computer-readable storage medium of claim 7,
wherein the operations further include:
compiling a scalar version of the called function; and
compiling a vector version of the called function.

9. The non-transitory computer-readable storage medium of claim 8, wherein compiling the calling function to utilize the parallel implementation of the called function comprises compiling the calling function to utilize the vector version of the called function dependent at least, in part, on the generated determination.

10. The non-transitory computer-readable storage medium of claim 7, wherein compiling the calling function to utilize the parallel implementation of the called function comprises generating multithreaded code corresponding to the calling function dependent at least, in part, on the generated determination.

11. The non-transitory computer-readable storage medium of claim 7, wherein identifying the possible run-time data dependency comprises determining that the called function only reads a data item, only writes the data item, or both reads and writes the data item.

12. The non-transitory computer-readable storage medium of claim 7, wherein identifying the possible run-time data dependency comprises determining that the called function writes a data item that is read by the calling function.

13. The non-transitory computer-readable storage medium of claim 7, wherein the operations further include generating single thread code responsive to a determination that the calling function does not interact with the called function.

14. A method, comprising:
executing program instructions by one or more processors to perform operations comprising:
identifying, within source code of a called function, a dependency of the called function on a variable that is not defined by the called function's programming interface as a parameter of the called function;
generating a persistent dependency database associated with the called function, wherein the persistent dependency database stores an indication of the dependency, and wherein the indication is stored in the persistent dependency database prior to beginning compilation of source code including a calling function that calls the called function;
identifying a call to the called function within source code of the calling function, the identifying occurring subsequent to beginning compilation of the source code including the calling function;
accessing the persistent dependency database; and
compiling the calling function to utilize a parallel implementation of the called function responsive to detecting the indication of dependency stored in the persistent dependency database.

15. The method of claim 14, wherein the operations further include:
compiling a scalar version of the called function; and
compiling a vector version of the called function.

16. The method of claim 15, wherein compiling the calling function to utilize the parallel implementation of the called function comprises compiling the calling function to utilize the vector version of the called function responsive to detecting the indication of dependency stored in the persistent dependency database.

17. The method of claim 14, wherein compiling the calling function to utilize the parallel implementation of the called function comprises generating multithreaded code corresponding to the calling function responsive to detecting the indication of the dependency stored in the persistent dependency database.

18. The method of claim 14, wherein the indication of dependency indicates that the called function only reads a data item, only writes the data item, or both reads and writes the data item.

19. The method of claim 14, wherein the indication of dependency indicates that the called function writes a data item that is read by the calling function.

20. The method of claim 14, wherein the operations further include generating single thread code responsive to a determination that the calling function does not interact with the called function.

\* \* \* \* \*